United States Patent
Athalye et al.

(10) Patent No.: US 11,973,637 B1
(45) Date of Patent: Apr. 30, 2024

(54) SYSTEM AND METHOD FOR FALLBACK COMMUNICATIONS USING COMPOSITE AND CONCURRENT STATE MACHINES

(71) Applicant: Walmart Apollo, LLC, Bentonville, AR (US)

(72) Inventors: Aditya Ajay Athalye, Bangalore (IN); Harish Amarshibhai Hothi, Karnataka (IN); Shiv Prakash, Bengaluru (IN); Yadnyesh Bharat Juvekar, Karnataka (IN)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 17/992,259

(22) Filed: Nov. 22, 2022

(51) Int. Cl.
*H04L 41/0663* (2022.01)
*H04L 41/0631* (2022.01)
*H04L 41/0668* (2022.01)

(52) U.S. Cl.
CPC ........ *H04L 41/0663* (2013.01); *H04L 41/064* (2013.01); *H04L 41/0668* (2013.01)

(58) Field of Classification Search
CPC ............... H04L 41/064; H04L 41/0663; H04L 41/0668
USPC ........................................................ 709/224
See application file for complete search history.

(56) References Cited

U.S. PATENT DOCUMENTS

| | | | | |
|---|---|---|---|---|
| 6,115,826 A | * | 9/2000 | Kinkade | G06F 1/14 713/502 |
| 9,158,331 B2 | | 10/2015 | Zhou et al. | |
| 2002/0198946 A1 | | 12/2002 | Wang et al. | |
| 2005/0027939 A1 | * | 2/2005 | Lin | G06F 3/0683 711/170 |

(Continued)

FOREIGN PATENT DOCUMENTS

| | | |
|---|---|---|
| CN | 103064739 A | 4/2013 |
| CN | 111107503 A | 5/2020 |

(Continued)

OTHER PUBLICATIONS

G. Varghese et al., "Hashed and Hierarchical Timing Wheels: Efficient Data Structures for implementing a Timer Facility," IEEE, ACM Transactions on Networking, vol. 5, No. 6, Dec. 1997, pp. 824-834.

*Primary Examiner* — David P Zarka
(74) *Attorney, Agent, or Firm* — Morgan, Lewis & Bockius LLP; Manita Rawat

(57) ABSTRACT

Systems and methods of fallback electronic communications are disclosed. A system is configured to receive a communication campaign including data identifying at least one communication channel and implement a fallback state machine having a first composite state corresponding to the at least one communication channel. An initial electronic communication is transmitted via the at least one communication channel and an initial timer having a first predetermined timeout period is implemented. When a confirmation is received prior to expiration of the initial timer, the fallback state machine transitions to a complete state. When the confirmation is not received prior to expiration of the initial timer, a first composite fallback state corresponding to a first set of fallback communication channels is implemented and a first fallback electronic communication is transmitted via the first set of fallback communication channels.

11 Claims, 16 Drawing Sheets

(56) References Cited

U.S. PATENT DOCUMENTS

| | | | |
|---|---|---|---|
| 2007/0253331 A1* | 11/2007 | Ilnicki | H04L 43/00 |
| | | | 370/428 |
| 2018/0123872 A1* | 5/2018 | Zhang | H04L 43/0817 |
| 2018/0368099 A1* | 12/2018 | Chen | H04W 68/02 |
| 2019/0042303 A1 | 2/2019 | Chen et al. | |
| 2020/0067761 A1* | 2/2020 | Schmitt | G06F 11/2038 |
| 2020/0092220 A1 | 3/2020 | Noureddine et al. | |
| 2022/0004469 A1* | 1/2022 | Shen | G06F 11/2028 |
| 2023/0032054 A1* | 2/2023 | Jayaramachar | H04W 8/00 |

FOREIGN PATENT DOCUMENTS

| | | |
|---|---|---|
| CN | 112181614 A | 1/2021 |
| CN | 114610467 A | 6/2022 |
| CN | 115237566 A | 10/2022 |
| GB | 2389274 A | 12/2003 |
| WO | 2002010941 A1 | 2/2002 |

\* cited by examiner

SYSTEM AND METHOD FOR FALLBACK COMMUNICATIONS USING COMPOSITE AND CONCURRENT STATE MACHINES

TECHNICAL FIELD

This application relates generally to electronic messaging systems and, more particularly, to electronic notification systems using multiple notification channels.

BACKGROUND

Communications between individuals are critical to provide necessary information at the right time to ensure needed information is delivered in a timely manner. In some instances, communications between electronic devices can provide information to one or more devices and/or individuals involved in an interaction, such as, for example, communications related to orders, deliveries, service interactions, and/or any other time-critical communications. These communications can be referred to as transactional messaging.

Transactional messaging can be provided by an automated system configured to generate communications at certain times and/or upon occurrence of certain events. Current systems can be configured to interact with multiple communication channels. However, current systems utilize only preset communication channels for certain communications. Further, current systems are not able to determine whether a communication was received and are not capable of adjusting communication channels based on system feedback.

SUMMARY

In various embodiments, a system configured to provide fallback communications is disclosed. The system includes a memory having instructions stored thereon and a processor operatively coupled to the memory. The instructions when executed by the processor, cause the processor to receive a communication campaign including data identifying at least one communication channel, implement a fallback state machine having a first composite state corresponding to the at least one communication channel, transmit an initial electronic communication via the at least one communication channel, and implement an initial timer having a first predetermined timeout period. When a confirmation is received prior to expiration of the initial timer, the fallback state machine transitions to a complete state. When the confirmation is not received prior to expiration of the initial timer, a first composite fallback state corresponding to a first set of fallback communication channels is implemented and a first fallback electronic communication is transmitted via the first set of fallback communication channels.

In various embodiments, a computer-implemented method of fallback communications is disclosed. The computer-implemented method includes steps of implementing a fallback state machine having at least one initial composite state corresponding to at least one initial communication channel, transitioning the at least one initial composite state to a first substate when an initial electronic communication is transmitted via the at least one initial communication channel, and implementing an initial timer having a predetermined timeout period. When a confirmation is received prior to expiration of the initial timer, the fallback state machine transitions to a complete state. When the confirmation is not received prior to expiration of the initial timer, a first composite fallback state corresponding to a set of first fallback communication channels is implemented and the first composite fallback state is transitioned to a first substate when a fallback electronic communication is transmitted via a fallback communication channel in the set of first fallback communication channels. The first composite fallback state is a substate of the at least one composite state.

In various embodiments, a non-transitory computer readable medium having instructions stored thereon is disclosed. The instructions, when executed by at least one processor, cause a device to perform operations including implementing a fallback state machine having a plurality of composite states including a first composite state representative of a first communication channel and a second composite state representative of a second communication channel, transmitting a set of initial electronic communications via the first communication channel and the second communication channel, transitioning the first composite state of the fallback state machine to a dispatched substate when a first initial electronic communication in the set of initial electronic communications is transmitted via the first communication channel, transitioning the second composite state of the fallback state machine to a dispatched substate state when a second initial electronic communication in the set of initial electronic communications is transmitted via the second communication channel, and implementing an initial timer having a predetermined timeout period for each of the first composite state and the second composite state. When a confirmation is received prior to expiration of the initial timer, the fallback state machine is transitioned to a complete state. When the confirmation is not received prior to expiration of the initial timer, a composite fallback state corresponding to at least one fallback communication channel is implemented and a first fallback electronic communication is transmitted via the at least one fallback communication channel.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

This description of the exemplary embodiments is intended to be read in connection with the accompanying drawings, which are to be considered part of the entire written description. Terms concerning data connections, coupling and the like, such as "connected" and "interconnected," and/or "in signal communication with" refer to a relationship wherein systems or elements are electrically and/or wirelessly connected to one another either directly or indirectly through intervening systems, as well as both moveable or rigid attachments or relationships, unless expressly described otherwise. The term "operatively coupled" is such a coupling or connection that allows the pertinent structures to operate as intended by virtue of that relationship.

In the following, various embodiments are described with respect to the claimed systems as well as with respect to the claimed methods. Features, advantages, or alternative embodiments herein can be assigned to the other claimed objects and vice versa. In other words, claims for the systems can be improved with features described or claimed in the context of the methods. In this case, the functional features of the method are embodied by objective units of the systems.

Furthermore, in the following, various embodiments are described with respect to methods and systems for fallback communications using composite and concurrent state machines. In some embodiments, a transactional messaging system transmits a first communication via one or more first channels. If a successful delivery notification is not received during a first predetermined timeout period for the first communication, or a delivery failure notification is received for each of the first channels, the transactional messaging system transmits a second communication via one or more second channels. If a successful delivery notification is not received during a second predetermined timeout period for the second communication, or a delivery failure notification is received for each of the second channels, the transactional messaging system transmits a third communication via one or more third channels. The transactional messaging system can include any number of nested communications and/or communication channels that are activated in a hierarchical (e.g., cascading) fashion if the prior communication has failed. The nested fallback communication process ends when a successful delivery notification is received or when all potential communications have been sent.

Figure 1:
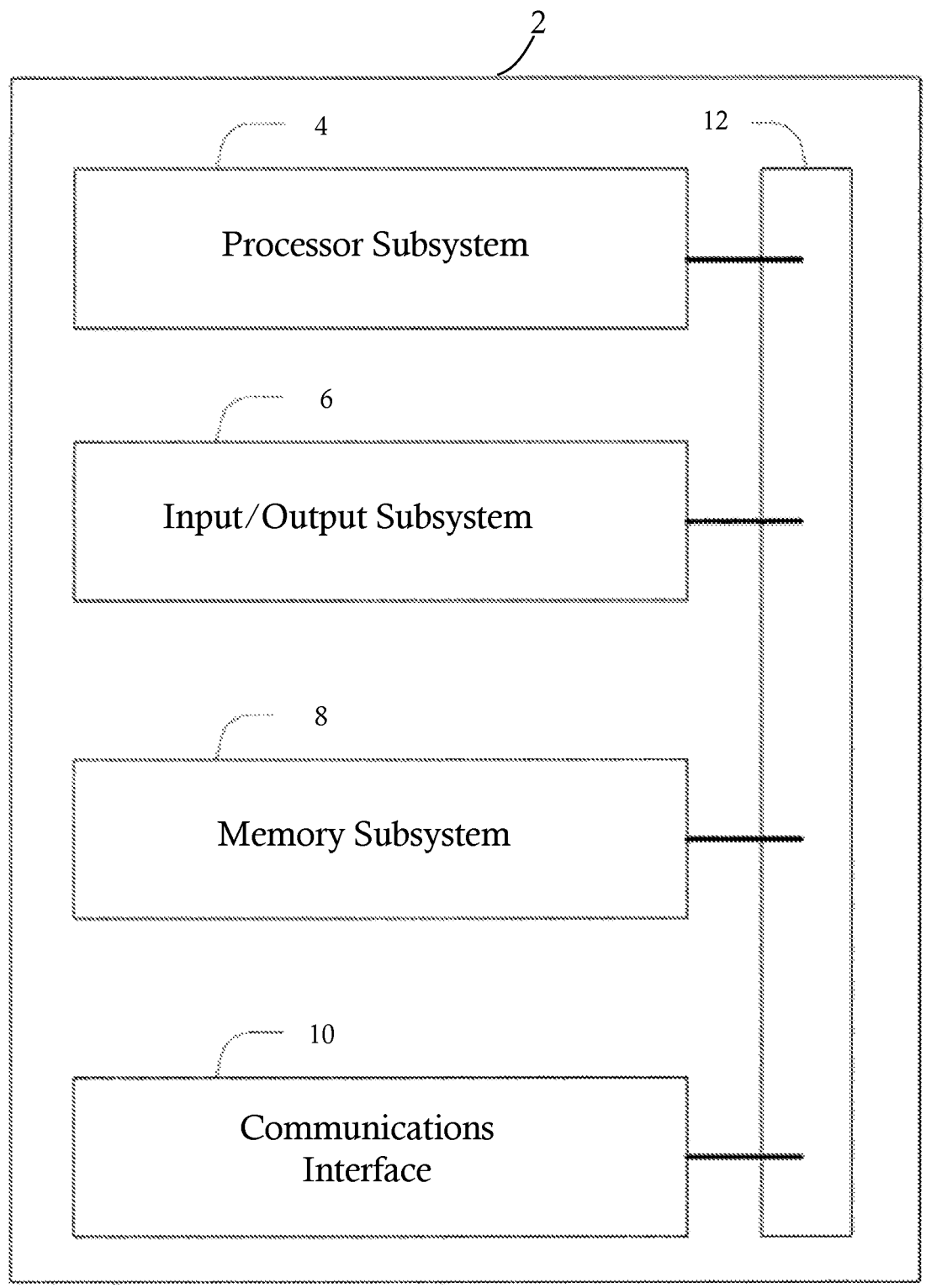
FIG. 1 illustrates a computer system configured to implement one or more processes, in accordance with some embodiments.

FIG. 1 illustrates a system configured to implement one or more processes, such as a transactional messaging process, in accordance with some embodiments. The system 2 is a representative device and can include a processor subsystem 4, an input/output subsystem 6, a memory subsystem 8, a communications interface 10, and a system bus 12. In some embodiments, one or more than one of the system 2 components 4-12 can be combined or omitted such as, for example, not including an input/output subsystem 6. In some embodiments, the system 2 can include other components not combined or included in those shown in FIG. 1. For example, the system 2 can also include a power subsystem. In other embodiments, the system 2 can include several instances of the components shown in FIG. 1. For example, the system 2 can include multiple memory subsystems 8. For the sake of conciseness and clarity, and not limitation, one of each of the components is shown in FIG. 1.

The processor subsystem 4 can include any processing circuitry operative to control the operations and performance of the system 2. In various aspects, the processor subsystem 4 can be implemented as a general purpose processor, a central processing unit (CPU), a graphics processing unit (GPU), a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, /or a very long instruction word (VLIW) microprocessor, a virtual processor, any other processing device, and/or any combination thereof. The processor subsystem 4 also can be implemented by a controller, a microcontroller, an application specific integrated circuit (ASIC), a field programmable gate array (FPGA), a programmable logic device (PLD), etc., and/or any combination thereof.

In various aspects, the processor subsystem 4 can be arranged to run an operating system (OS) and various applications. Examples of an OS comprise, for example, operating systems generally known under the trade name of Apple OS, Microsoft Windows OS, Android OS, Linux OS, and any other proprietary or open-source OS. Examples of applications comprise, for example, network applications, local applications, data input/output applications, user interaction applications, etc.

In some embodiments, the system 2 can include a system bus 12 that couples various system components including the processing subsystem 4, the input/output subsystem 6, and the memory subsystem 8. The system bus 12 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCMCIA), Small Computers Interface (SCSI) or other proprietary bus, or any custom bus suitable for computing device applications.

In some embodiments, the input/output subsystem 6 can include any suitable mechanism or component to enable a user to provide input to system 2 and the system 2 to provide output to the user. For example, the input/output subsystem 6 can include any suitable input mechanism, including but not limited to, a button, keypad, keyboard, click wheel, touch screen, motion sensor, microphone, camera, etc.

In some embodiments, the input/output subsystem 6 can include a visual peripheral output device for providing a display visible to the user. For example, the visual peripheral output device can include a screen such as, for example, a Liquid Crystal Display (LCD) screen. As another example, the visual peripheral output device can include a movable display or projecting system for providing a display of content on a surface remote from the system 2. In some embodiments, the visual peripheral output device can include a coder/decoder, also known as Codecs, to convert digital media data into analog signals. For example, the visual peripheral output device can include video Codecs, audio Codecs, or any other suitable type of Codec.

The visual peripheral output device can include display drivers, circuitry for driving display drivers, or both. The visual peripheral output device can be operative to display content under the direction of the processor subsystem 4. For example, the visual peripheral output device may be able to play media playback information, application screens for application implemented on the system 2, information regarding ongoing communications operations, information regarding incoming communications requests, or device operation screens, to name only a few.

In some embodiments, the communications interface 10 can include any suitable hardware, software, or combination of hardware and software that is capable of coupling the system 2 to one or more networks and/or additional devices. The communications interface 10 can be arranged to operate with any suitable technique for controlling information signals using a desired set of communications protocols, services, or operating procedures. The communications interface 10 can include the appropriate physical connectors to connect with a corresponding communications medium, whether wired or wireless.

Vehicles of communication comprise a network. In various aspects, the network may comprise local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 10 may comprise one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 10 may comprise a wireless interface comprising one or more antennas, transmitters, receivers, transceivers, amplifiers, filters, control logic, and so forth.

In various aspects, the communications interface 10 may provide data communications functionality in accordance with a number of protocols. Examples of protocols may comprise various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols (e.g., Bluetooth Specification versions 5.0, 6, 7, legacy Bluetooth protocols, etc.) as well as one or more Bluetooth Profiles, and so forth. Yet another example of wireless protocols may comprise near-field communication techniques and protocols, such as electro-magnetic induction (EMI) techniques. An example of EMI techniques may comprise passive or active radio-frequency identification (RFID) protocols and devices. Other suitable protocols may comprise Ultra-Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 8.

In some embodiments, the memory subsystem 8 may comprise any machine-readable or computer-readable media capable of storing data, including both volatile/non-volatile memory and removable/non-removable memory. The memory subsystem 8 may comprise at least one non-volatile memory unit. The non-volatile memory unit is capable of storing one or more software programs. The software programs may contain, for example, applications, user data, device data, and/or configuration data, or combinations therefore, to name only a few. The software programs may contain instructions executable by the various components of the system 2.

In various aspects, the memory subsystem 8 may comprise any machine-readable or computer-readable media capable of storing data, including both volatile/non-volatile memory and removable/non-removable memory. For example, memory may comprise read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory subsystem 8 may contain an instruction set, in the form of a file for executing various methods, such as methods including fallback communications utilizing concurrent, composite state machines, as described herein. The instruction set may be stored in any acceptable form of machine-readable instructions, including source code or various appropriate programming languages. Some examples of programming languages that may be used to store the instruction set comprise, but are not limited to: Java, C, C++, C #, Python, Objective-C, Visual Basic, or .NET programming. In some embodiments a compiler or interpreter is comprised to convert the instruction set into machine executable code for execution by the processing subsystem 4.

Figure 2:
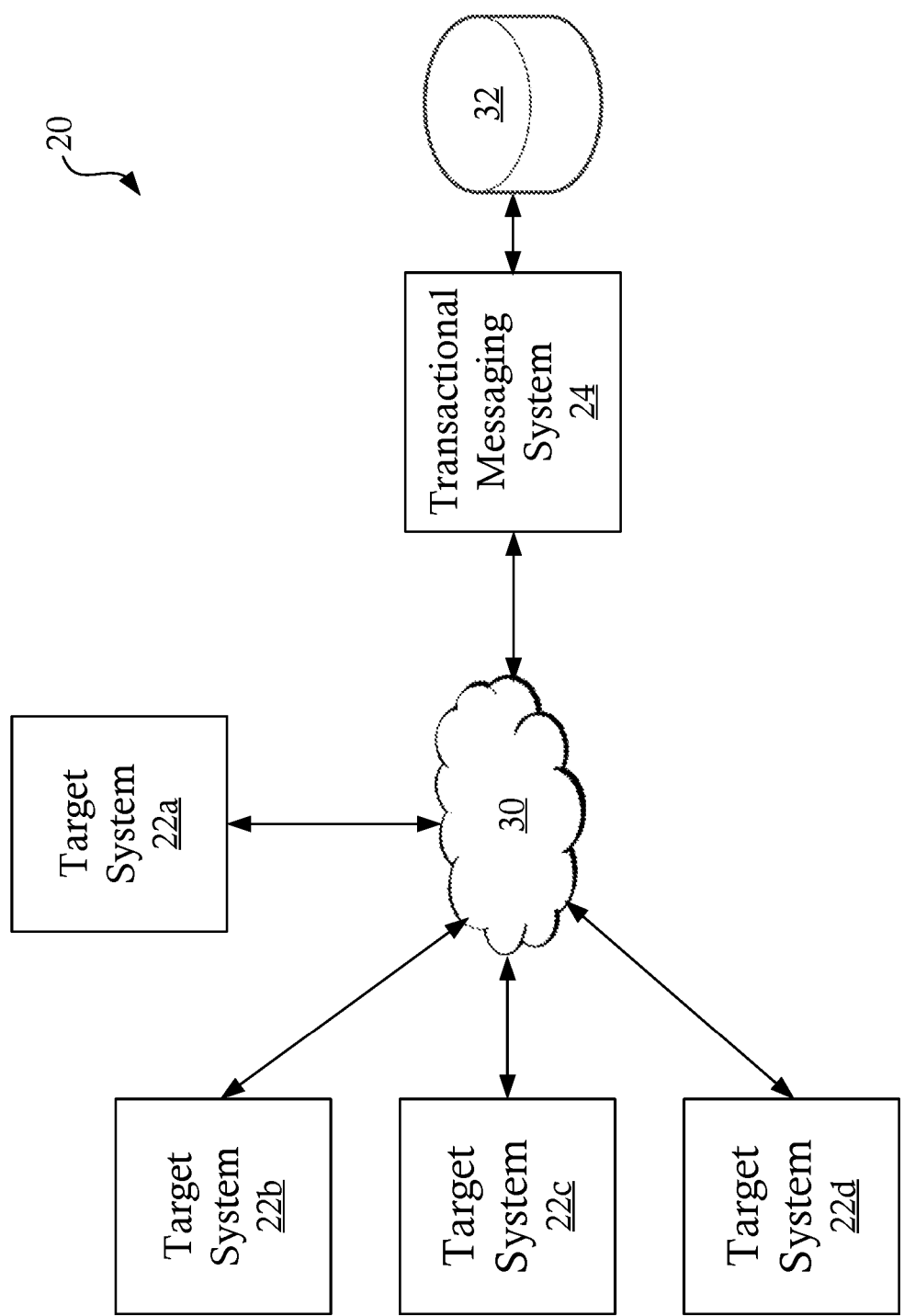
FIG. 2 illustrates a network environment configured to provide fallback communications using a transactional messaging system including composite and concurrent state machines, in accordance with some embodiments.

FIG. 2 illustrates a network environment 20 configured to provide fallback communications using a transactional messaging system including composite and concurrent state machines, in accordance with some embodiments. The network environment 20 includes a plurality of systems configured to communicate over one or more network channels. For example, in various embodiments, the network environment 20 can include, but is not limited to, one or more target devices 22a-22d configured to receive one or more communications via one or more communication channels and at least one transactional messaging system 24.

Although specific embodiments are discussed herein, it will be appreciated that additional systems can be included in the network environment 20. In addition, each of the illustrated systems 22a-24 can be combined into fewer systems and/or expanded into multiple additional systems configured to perform parallel, serial, and/or unrelated operations. Each of the illustrated systems 22a-24 is configured to communicate via one or more communication channels represented as network cloud 30.

The transactional messaging system 24 is configured to generate and transmit one or more electronic messages regarding one or more transactional activities, events, functions, etc. to one or more of the target devices 22a-22d. An electronic message can take any suitable form, such as, for example, a text message (e.g., SMS, MMS), an e-mail, a push notification, a messaging app message, an on-site messaging service message, an interactive voice response message, and/or any other suitable electronic message. As used herein, the term electronic message refers to messages that are automatically generated by the transactional messaging system 24.

In some embodiments, the transactional messaging system 24 includes a communication fallback engine configured to implement a method of fallback communications using a concurrent, composite state machine, as discussed in greater detail below. The communication fallback engine can be configured to transmit one or more initial transactional communications to one or more target devices 22a-22d. For example, in some embodiments, the communication fallback engine can be configured to transmit a first initial transactional communication to a first target device 22a.

In some embodiments, a target device 22a-22d that receives a transactional communication from the communication fallback engine is configured to generate a confirmation reply when then transactional message is received by a recipient. Receipt of a transactional message can include, but is not limited to, reading a message on the target device 22a-22d, listening to a message via the target device 22a-22d, opening a message on the target device 22a-22d, receiving a message at the target device 22a-22d, and/or any other operation performed by the target device 22a-22d indicative of a message being received. When a message is received, the target device 22a-22d generates a confirmation reply that is received by the transactional messaging system 24, e.g., the communication fallback engine, to indicate a successful communication.

The communication fallback engine implements a fallback n-level state machine to coordinate fallback communications for the initial transactional communications. In some embodiments, the communication fallback engine implements timeout-based state transitions for the fallback n-level state machine to transition to fallback communication channels. For example, when an initial communication is transmitted to a first target device 22a, a timeout timer can be initiated. If a confirmation reply is not received by the communication fallback engine within the predetermined timeout period, the fallback n-level state machine transitions to a fallback communication level and initiates fallback communications.

In various embodiments, fallback communications can include communications having similar content to the initial communication but transmitted over alternative communication channels. For example, in some embodiments, an initial communication related to a payment authorization failure is sent to a first target device 22a. If a confirmation reply is not received within the predetermined timeout period, a fallback communication related to the payment authorization failure can be sent to a second target device 22b. As will be discussed in greater detail below, fallback communications can be managed by a fallback n-level state machine including composite, concurrent states to ensure proper fallback communication flow and cascading of confirmation replies to higher level states within the fallback n-level state machine.

In some embodiments, the fallback n-level state machine includes multiple, nested concurrent states configured to manage various levels of fallback communications. For example, to continue the prior example, after the fallback communication is transmitted to the second target device 22b, a second timeout timer can be initiated for that communication. If a confirmation reply is not received from the second target device 22b within the timeout period, a second level of fallback communications can be initiated, and fallback communications can be transmitted to a third target device 22c and a fourth target device 22d. It will be appreciated that the fallback communications can include any number of fallback communications at any number of levels. As used herein, the term "fallback communication schema" refers to a nested set of fallback communication channels that are utilized in a hierarchical manner.

In some embodiments, a fallback schema defining one or more parameters of a fallback communication process can be obtained from a database 32. The fallback schema can include data identifying an initial set of communication channels, one or more levels of fallback communication channels, a fallback n-level state machine, and/or any other data necessary for implementing a fallback communication process.

In various embodiments, the system or components thereof can comprise or include various modules or engines, each of which is constructed, programmed, configured, or otherwise adapted, to autonomously carry out a function or set of functions. An engine can include a component or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

In various embodiments, the transactional messaging system 24 is configured to implement one or more n-level composite, concurrent state machines, or state engines. A state machine is a behavioral model that includes a set of states one or more transitions between one or more of the states in the set of states. State machines including a determinable number of states and are referred to as finite state machines (e.g., having a finite number of possible states). In a simple state machine, a current state and an input are used to determine a state transition. State transitions can include a transition to a new state and/or a transition to the current state. Simple state machines include a transitions from a single current state to a single future state.

Composite state machines include one or more states having substates therein. For example, a first state may include a first substate and a second substate. When a state machine transitions from a composite state, the state machine transitions from all of the substates contained within the state machine. A composite state can be exited when one or more substates indicate a transition to a new state, when all of the substates have completed, and/or based on an input to the state.

Figure 3:
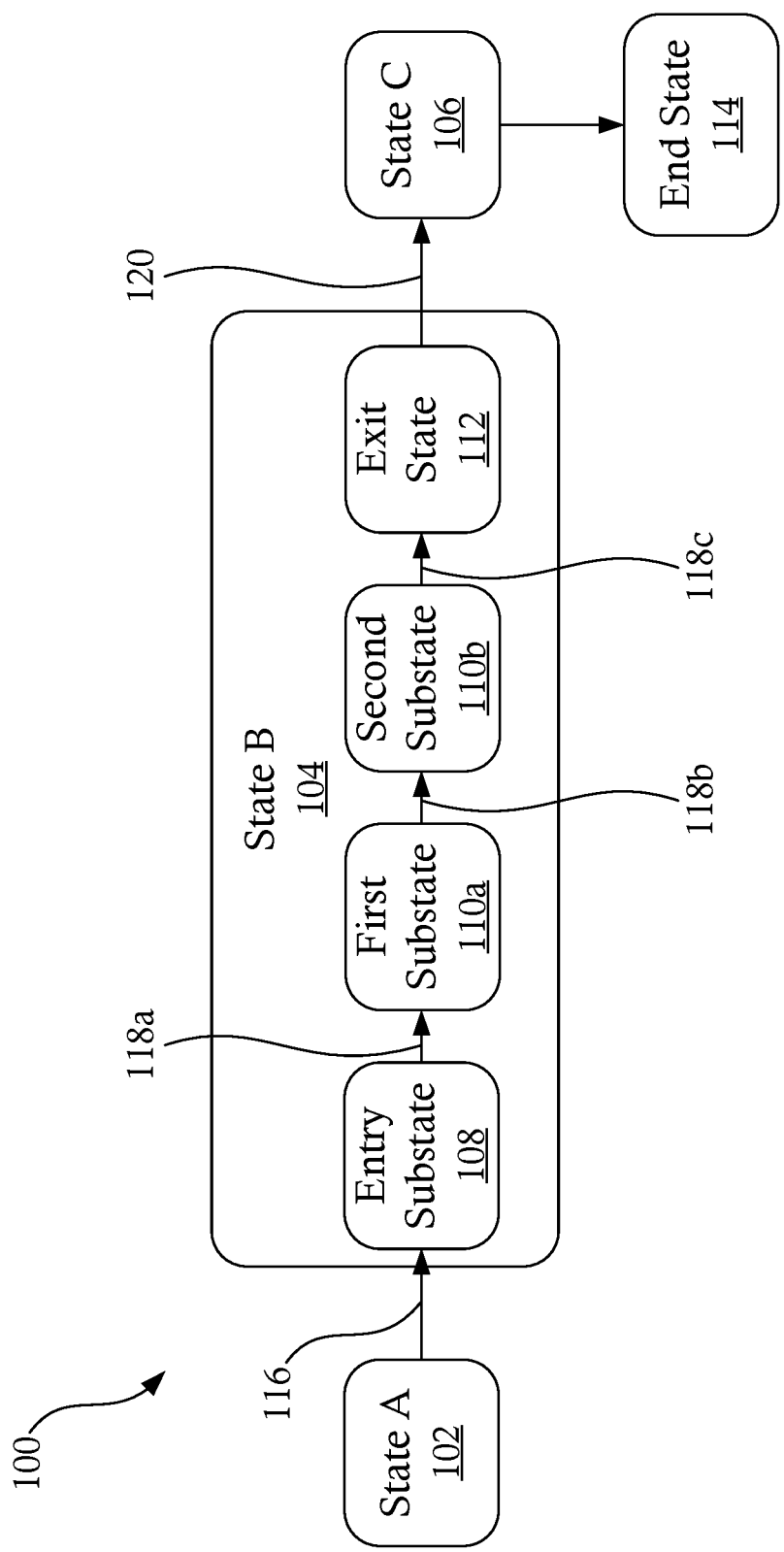
FIG. 3 illustrates a composite state machine including three states, in accordance with some embodiments.

FIG. 3 illustrates an example composite state machine 100, in accordance with some embodiments. The composite state machine 100 includes three states, state A 102, state B 104, and state C 106. Although examples are illustrated herein containing three states, it will be appreciated that any number of states, including both simple and/or composite states, may be included in the composite state machine 100. The composite state machine 100 includes an end state 114, although it will be appreciated that end state 114 is provided only for illustration purposes and can be omitted. State B 104 is a composite state containing an entry state 108, a first substate 110a, a second substate 110b, and an exit state 112. It will be appreciated that entry state 108 and exit state 112 can be omitted such that the composite state 104 contains only the substates 110a, 110b.

When a boundary transition 116 occurs from the state A 102 to state B 104, the substates of the composite state B 104 are executed. For example, after boundary transition 116, the state machine 100 executes entry state 108 to enter the composite state B 104. The state machine 100 transitions 118a to the first substate 110a. A subsequent boundary transition 118b occurs, for example, upon execution of the first substate 110a and/or after receiving an input, the state machine 100 transitions to the second substate 110b. A subsequent boundary transition 118c, for example occurring upon execution of the second substate 110b and/or after receiving an input, the state machine 100 transitions to the exit state 112, which causes a boundary transition 120 to state C 106. Although the substates 110a, 110b of composite state B 104 are illustrated as sequential states, the composite state B 104 can additionally or alternatively include concurrent (e.g., parallel) states, as discussed in greater detail below.

Concurrent state machines include multiple states that may be entered and/or exited in parallel. For example, a concurrent state machine may transition into two or more states simultaneously when leaving a first state. As another example, a concurrent state machine can transition to a first state and, while still in the first state, can additionally transition to a second state. Concurrent states can include simple states and/or complex states, such as composite states.

Figure 4:
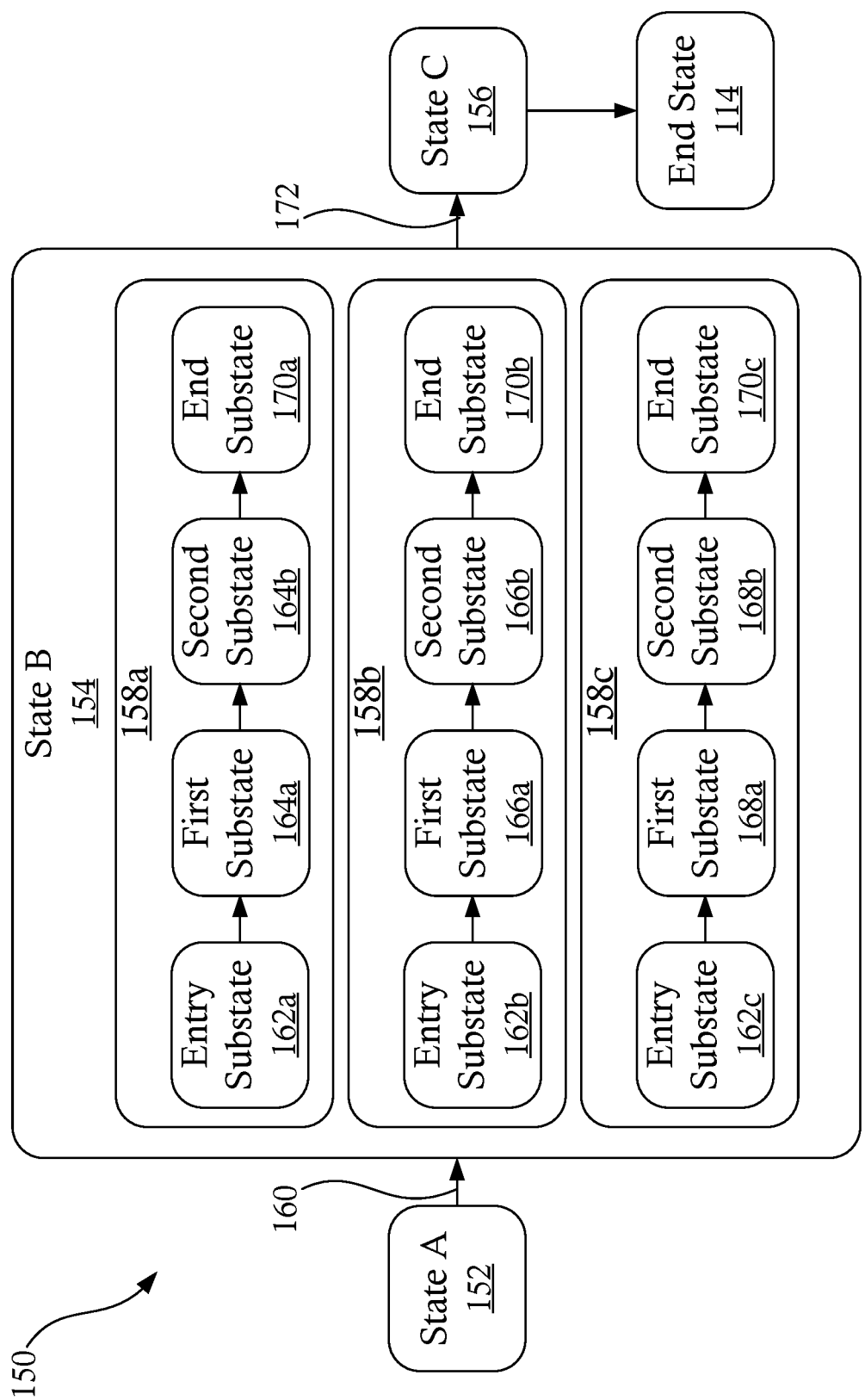
FIG. 4 illustrates an example concurrent state machine, in accordance with some embodiments.

FIG. 4 illustrates an example concurrent state machine 150, in accordance with some embodiments. The concurrent state machine 150 includes three states, state A 152, state B 154, and state C 156. Although examples are illustrated herein containing three states, it will be appreciated that any number of states, including both simple and/or composite states, may be included in a state machine. State B 154 is a concurrent state including multiple concurrently executed composite states 158a-158c. When a boundary transition 160 occurs from state A 152 to concurrent state B 154, each of the concurrent composite states 158a-158c are executed in parallel. For example, when transitioning to concurrent state B 154, the state machine 150 executes the entry substate 162a, 162b, 162c of each of the concurrent composite states 158a-158c and steps through the substates 164a, 164b, 166a, 166b, 168a, 168b (collectively "substates 164-168") of each of the concurrent composite states 158a-158c until reaching an exit or end substate 170a, 170b, 170c for each of the concurrent composite states 158a-158c. The state machine 150 can transition 172 from the concurrent state B 154 to state C 156 when one or more of the concurrent composite states 158a-158c complete. After state C 156 completes, the composite state machine 150 transitions to an end state 114.

A transactional messaging system including concurrent, composite state machines provides a reliable mechanism for chaining fallback operations, such as transactional communications, through the usage of feedback associated with each message generated by the transactional messaging system. As discussed in greater detail below, at each level of a concurrent, composite state machine, the transactional messaging system can generate one or more transactional messages using one or more channels, receive feedback regarding each of the one or more transactional messages, and transition to one or more additional states based on the message feedback. In some embodiments, if any one of a set of concurrent communications succeeds, the transactional messaging system identifies a successful communication and exits the hierarchical concurrent, composite state machine. At each level of the concurrent, composite state machine, one or more concurrent states can be executed in parallel depending on the number of fallbacks identified for a specific level. As discussed in greater detail below, a concurrent state can be triggered through usage of configurable state timeouts on delivered and/or sent states of a specific message and channel.

Figure 15:
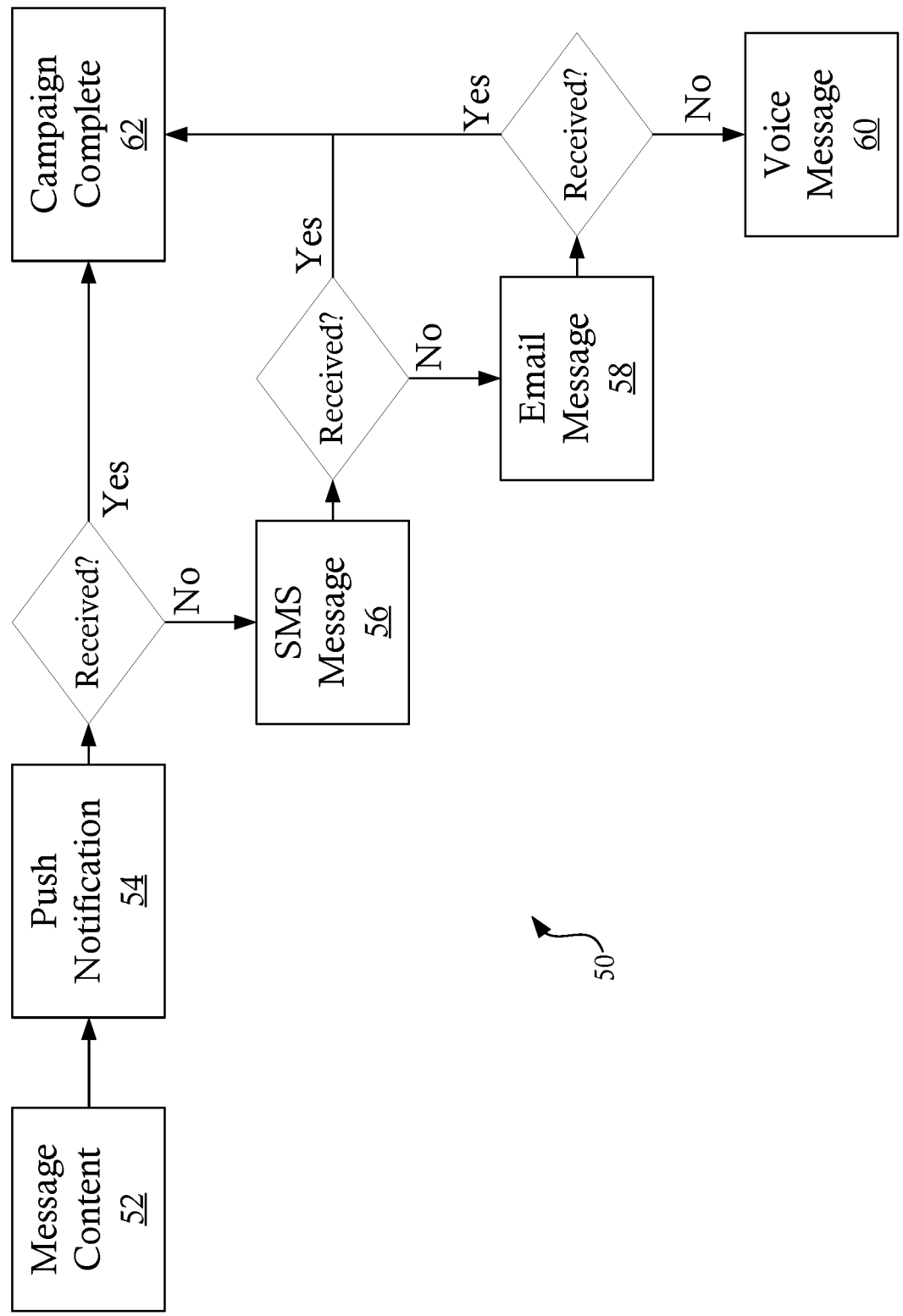
FIG. 15 illustrates a process flow for a fallback communication system, in accordance with some embodiments.

As shown in FIG. 15, in some embodiments, a transactional messaging system 24 can include a fallback communication engine 50 configured to receive messaging content 52 (e.g., a messaging campaign) and implement a sequence of fallback communications managed by an n-level state machine. For example, in some embodiments, a fallback communication engine 50 receives message content 52 and generates a communication campaign including a message to be delivered to a user via a user device. The message can include, for example, a notification of delivery, a failure to complete a payment transaction, and/or any other suitable communication. The fallback communication engine 50 generates an initial communication, e.g., a push notification 54, and transmits the initial communication 54 to the target device, such as a first target device 22a, via a first communication channel, e.g., a communication channel associated with an application configured to provide the push notification 54. The fallback communication engine 50 represents the push notification 54 as an initial state in the n-level state machine 52, as discussed in greater detail below.

If a confirmation reply (such as a read receipt or acknowledgement message from an application) is received from the target device 22a within a predetermined time period, the communication campaign completes 62. However, if a confirmation reply is not received from the target device 22a within a predetermined time period, the fallback communication engine 50 assumes the message was not received and generates a first fallback communication, such as an SMS message 56, which is transmitted to the target device 22a via a second, different communication channel or protocol, such as via a cellular network configured to deliver SMS messages. The SMS message 56 is represented as a first fallback state in the n-level state machine 52, as discussed in greater detail below.

If a confirmation reply (such as a responsive SMS message) is received from the target device 22a within a predetermined time period, the communication campaign completes 62. However, if a confirmation reply is not received from the target device 22a within a predetermined time period after the SMS message 56 is sent, additional fallback communications, such as an e-mail message 58 or a computer-generated voice call 60, are generated and sent to the target device 22a and/or a different device. The additional fallback communications, e.g., e-mail message 58 or the computer-generated voice call 60, are represented by additional fallback states in the n-level state machine, as discussed in greater detail below.

The fallback communication engine 50 will continue generating fallback communications, and corresponding states within the n-level state machine 52, until a confirmation reply is received or until all possible fallback communications have been tried. As discussed in greater detail below, a composite, concurrent n-level state machine can be configured to include a plurality of nested states representative of each fallback communication generated by a fallback communication engine 50. In addition, and as discussed in greater detail below, a fallback communication engine 50 can generate two or more communications at each level, e.g., generating two initial communications or two fallback communications via two different communication channels.

Figure 5:
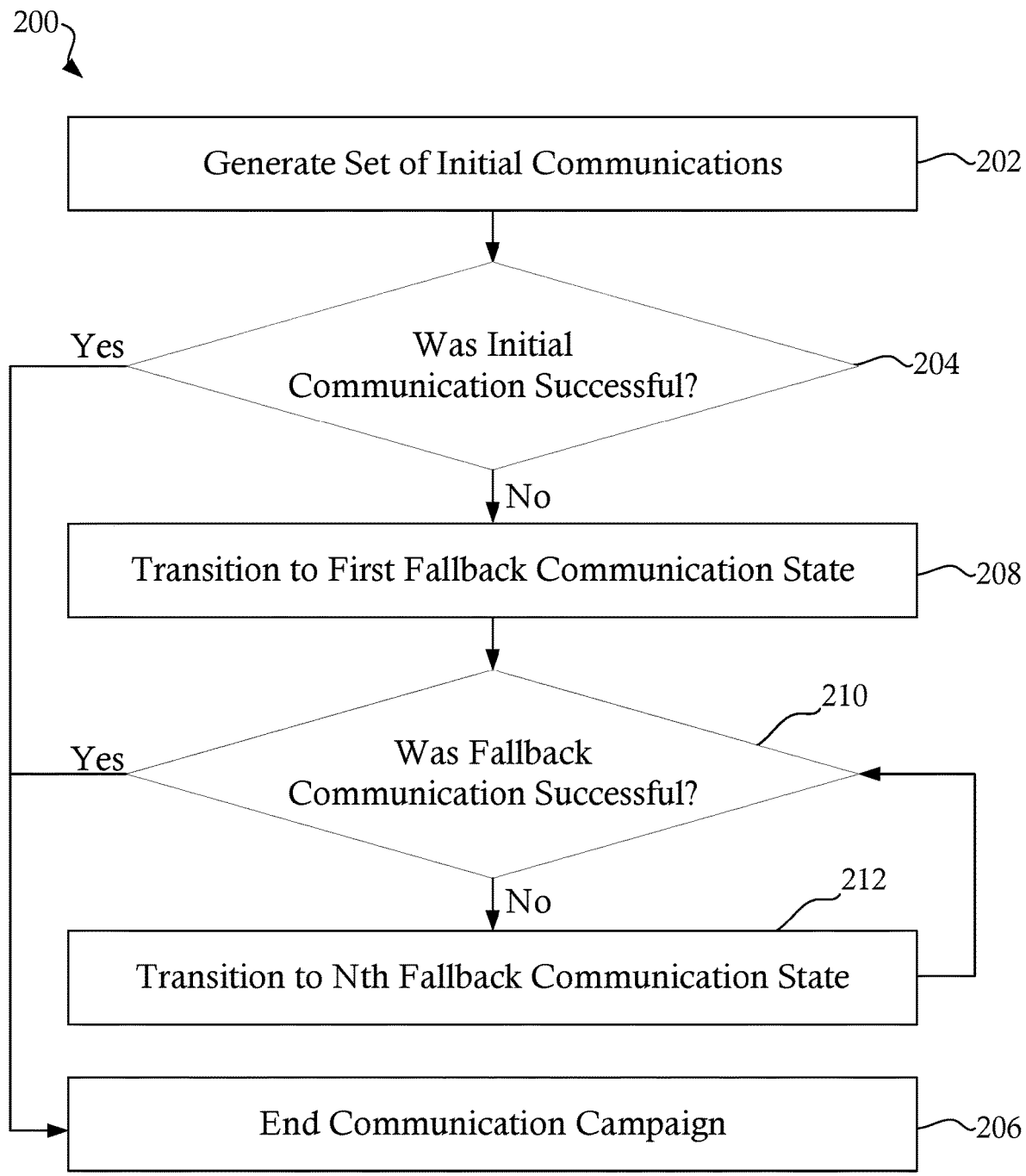
FIG. 5 is a flowchart illustrating a method of providing fallback communication, in accordance with some embodiments.
Figure 6:
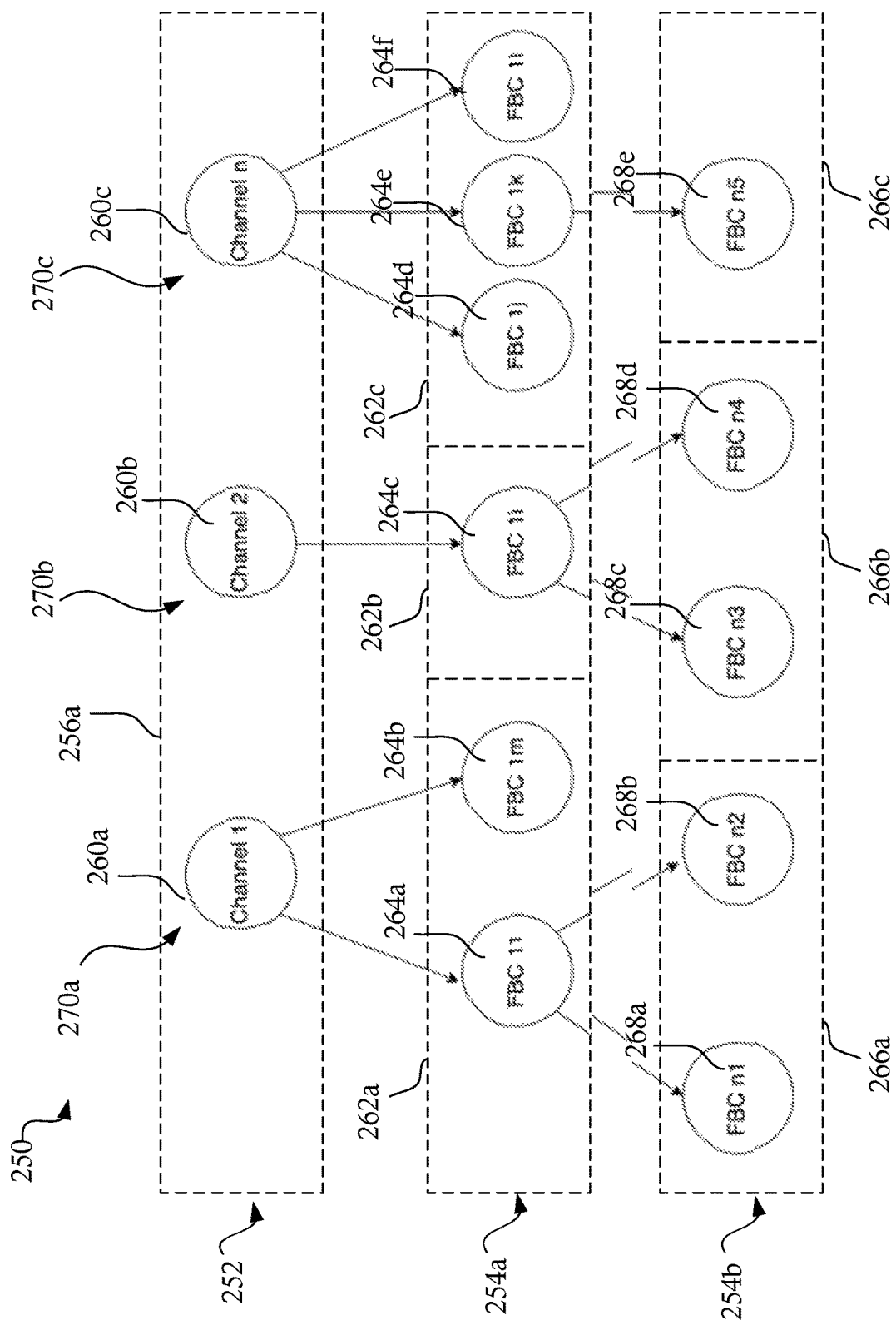
FIG. 6 illustrates a fallback n-level state machine configured to implement one or more steps of the method, in accordance with some embodiments.

FIG. 5 is a flowchart illustrating a method 200 of providing fallback communication, in accordance with some embodiments. FIG. 6 illustrates a hierarchical data structure 250 configured to implement one or more steps of the method 200, in accordance with some embodiments. The hierarchical data structure 250 illustrates an example data structure that may be implemented by a communication fallback engine configured to implement the method 200 of providing fallback communication. The hierarchical data structure 250 is a hierarchical structure including an initial level 252, a first fallback level 254a, and a second fallback level 254b (the first and second fallback levels 254a, 254b are referred to collectively herein as "fallback levels 254"). Each level 252-254 represents a hierarchical level in the structure of the hierarchical data structure 250. At each level 252-254, one or more communications are provided via a corresponding communication channel.

The hierarchical data structure 250 is illustrated as a tree-structure having an implicit assumption of no cycles, where each fallback channel at each level 252, 254 can have from 0 to any number of fallbacks at a next lowest level. The hierarchical data structure 250 ensures that fallback to a lower level 254a, 254b will not occur until the parent channel 252, 254a execution has commenced.

At step 202, a set of initial communications is generated over one or more communication channels. For example, as shown in FIG. 6, the initial level 252 of the hierarchical data structure 250 includes a first state 260a corresponding to a communication generated over a first communication channel, a second state 260b corresponding to a communication generated over a second communication channel, and a third state 260c corresponding to a communication generated over a third communication channel.

The content of each of the communications generated at step 202 may be similar. For example, in various embodiments, the set of initial communications all correspond to an initial notification regarding delivery, payment, scheduling, and/or other transactional interaction. As another example, in various embodiments, the content of each communication can be at least partially dependent on the communication channel and the capabilities of the messaging format. For example, certain communication channels are capable of more robust communications and therefore can include additional and/or alternative information. It will be appreciated that each communication can include more or less information depending on the communication channel, message type, and/or other factors.

Each of the communications in the initial set of communications can be transmitted over a different communication channel. As used herein the term "communication channel" refers to any variation in one or more parameters of a communication. For example, different communication channels can include, but are not limited to, different messaging systems, protocols, transmission channels, transmission types (e.g., wired, wireless, etc.), delivery mechanisms, and/or any other suitable variation in communication.

At step 204, a communication fallback engine determines whether any of the initial communications were successful. A successful communication can be determined based on a confirmation reply, a read receipt, other event generated by a client device, and/or execution of one or more additional activities. For example, in some embodiments, a communication can be sent to a client device. The client device can generate and transmit a confirmation reply, indicating the initial message was received. In some embodiments, a confirmation reply indicates that some activity occurred on a target device involving a transmitted communication. For example, a confirmation reply can indicate that a message was viewed, listened to, reviewed, read, and/or otherwise interacted with by the target device. A target device 22a-22d can be configured to automatically generate a responsive message indicating that an initial communication was opened, listened to, answered, or otherwise reviewed by an intended recipient.

Further, in some embodiments, acknowledgement of a communication can be evidenced by additional actions performed through and/or outside of the transactional communication system. For example, in some embodiments, an initial communication can correspond to a request to schedule a delivery, a service, or other time-sensitive activity. Although the communication itself may not be directly acknowledged, the transactional messaging system 24 can determine the communication was received if the time sensitive activity is scheduled. It will be appreciated that any suitable secondary action can provide an indication that an initial communication was received by an intended recipient system and/or individual.

In some embodiments, steps 202-204 are implemented as a concurrent state in the hierarchical data structure 250. For example, the initial level 252 of the hierarchical data structure 250 can be implemented as a first concurrent state 256 in a fallback n-level state machine. The first concurrent state 256 can include substates 260a-260c for each communication in the set of initial communications, or for each communication channel in the set of initial communications. In some embodiments, if one of the substates states 260a-260c indicates a successful communication, the first concurrent state 256 completes and proceeds to an end state (not shown).

If, at step 204, the communication fallback engine determines that a predetermined number of communications in the set of initial communications was successful, for example if a confirmation reply is received from a target device 22a, the communication fallback engine proceeds to step 206 and completes the method. In some embodiments, if a single communication is deemed successful, the method proceeds to step 206. In other embodiments, additional communications and/or additional actions can be required and/or monitored for determining a successful communication. For example, a communication fallback engine can determine that at least one communication in the set of initial communications was successful if one or more predetermined actions are performed. As one non-limiting example, at least one communication in the initial set of communications can be considered successful if a user device executes one or more additional processes, for example providing selections or data related to the content of the initial communication.

If, at step 204, the communication fallback engine determines that a predetermined number of the communications in the set of initial communications was unsuccessful, the transactional messaging system proceeds to step 208. For example, in some embodiments, the transaction messaging system proceeds to step 208 only if all of the communications generated at step 202 are determined to be unsuccessful, e.g., if no confirmation reply messages are received in response to any of the initial communications. As another example, in some embodiments, the transaction messaging system proceeds to step 208 if at least a certain number of communications are not identified as successful and/or certain activities have not yet been performed. It will be appreciated that any suitable criteria can be used for determining when to proceed to a fallback communication stage.

In some embodiments, the communication fallback engine includes a state timeout mechanism for identifying a failed communication. As discussed above, each state 260a-260c corresponds to an initial communication in a set of initial communications transmitted via an initial communication channel. Each state 260a-260c can include a timeout timer having a predetermined timeout period. If the timeout period of a state 260a-260c expires without a confirmation reply being received, the communication fallback engine identifies the communication associated with the state 260a-260c as an unsuccessful communication, and transitions to a fallback hierarchical level in the hierarchical data structure 250.

For example, in some embodiments, the first initial state 260a can include a first timeout timer having a first timeout period. After an initial communication is generated for the first initial state 260a, i.e., after a communication is sent via the first communication channel, the first timeout timer is started. If the first timeout timer completes, e.g., the first timeout timer runs for the first timeout period, prior to the transactional messaging system 24 receiving a confirmation reply, the transactional messaging system 24 transitions at least the first initial state 260a to one or more fallback states 264a, 264b within the first hierarchical fallback level 254.

The timeout period for each state 260a-260c at the initial level can be the same and/or different. For example, in some embodiments, each of the initial states 260a-260c includes a timeout timer having the same timeout period and/or utilize a shared timeout timer. As another example, in some embodiments, each of the initial states 260a-260c can have a timeout period determined by one or more parameters, such as, for example, the type of communication, communication channel used, average time of response for message type, timing of the communication, etc.

In some embodiments, transitions between states at a first level and states at a second level within the fallback n-level state machine 250 are performed on a state-by-state basis. For example, a first initial state 260a can have a first timeout period and a second initial state 260b can have a second timeout period that is longer than the first timeout period. Communications for both the first initial state 260a and the second initial state 260b can be generated simultaneously, starting timeout timers for both states 260a, 260b. The timeout timer of the first initial state 260a will expire first, as the first timeout period is shorter. The first initial state 260a can be transitioned when the first timeout period expires and fallback states 264a, 264b can be executed based on failure of the communication corresponding to the first initial state 260a. Subsequently, if the second timeout period expires without the second communication being successful, the second initial state 260b can be transitioned to fallback state 264c.

In some embodiments, the transitions between states at a first level and states at a second level within the fallback n-level state machines 250 are performed on a level-by-level basis. For example, a first initial state 260a and a second initial state 260b can each have timeout timers having the same timeout period (and/or a shared timeout timer). The timeout timers for each of the first initial state 260a and the second initial state 260b will expire simultaneously and each of the initial states 260a, 260b transition to corresponding substates 264a-264c.

At step 208, the fallback n-level state machine 250 transitions from one or more initial states 260a-260c to one or more fallback states 264a-264f. The one or more fallback states 264a-264f are located at a first fallback level 254a of the fallback n-level state machine 250. When the fallback n-level state machine 250 transitions from the initial level 252 to the first fallback level 254a, one or more concurrent states 264a-264f are entered for each of the states 260a-260c at the initial level 252. In the example illustrated in FIG. 6, two states 264a, 264b are executed in response to a first unsuccessful communication (corresponding to a first initial state 260a), a state 264c is executed for a second unsuccessful communication (corresponding to a second initial state 260b), and three states 264d-264f are executed in response to a third unsuccessful communication (corresponding to a third initial state 260c). Each of the states 264a-264f correspond to a fallback communication channel and/or mechanism identified for the corresponding initial state 260a-260c.

In some embodiments, communication channels corresponding to each of the first fallback states 264a-264f correspond to different communication channels. For example, each of the first fallback states 264a-264f can utilize a different communication protocol, program, transmission path, transmission mechanism, etc. In some embodiments, one or more of the first fallback states 264a-264f can include the same or similar communication channel as that used by any of the other first fallback states 264a-264f and/or the initial states 260a-260c. For example, a first fallback state 262a executed in response to an unsuccessful communication at the first initial state 260a can utilize the same communication channel as the second initial state 260b. In some embodiments, communication channels can be reused when the likelihood of success for that communication channel is high and/or the cost of the communication channel is low. It will be appreciated that rules for reusing a communication channel can be established as part of the hierarchical fallback structure implemented by the fallback n-level state machine 250.

The content of each of the communications generated at step 208 can be similar. For example, in various embodiments, a set of first fallback communications can all correspond to a follow-up or secondary notification regarding the subject matter of the initial set of communications, e.g., a delivery, payment, scheduling, and/or other transactional interaction. In some embodiments, the content of the set of first fallback communications can be altered as compared to the initial set of communications to indicate the fallback nature of the communications. For example, in some embodiments, the set of fallback communications can include an indication that the initial set of communications were unsuccessful.

At step 210, the communication fallback engine determines whether any of the communications at the first fallback level 254 were successful, e.g., determines whether any of the set of first fallback communications were successful. Similar to step 204, the communication fallback engine can rely on direct indications that a communication was successful (e.g., read receipts, acknowledgements, etc.) and/or indirect indications (e.g., performance of an action related to the content of the message, opening of a link in the message, etc.).

In some embodiments, steps 208-210 are implemented as a concurrent states in a fallback n-level state machine of the communication fallback engine. For example, the first fallback level 254a of a fallback n-level state machine can be implemented as one or more second concurrent states 262a-262c. The second concurrent states 262a-262c can each include substates 264a-264f. In some embodiments, if any one of the substates 264a-264f indicates a successful communication, the corresponding second concurrent state 262a-262c completes and the method proceeds to an end state (not shown).

If, at step 210, the communication fallback engine determines that a predetermined number of communications in the set of first fallback communications was successful, the communication fallback engine proceeds to step 206 and completes the method. For example, in some embodiments, if a single communication is determined to be a successful communication, the method proceeds to step 206. In other embodiments, additional communications and/or additional actions must be completed. For example, in some embodiments, a communication fallback engine can determine that at least one communication in the set of first fallback communications was successful if a corresponding action is performed, such as the communication fallback engine receiving a notification that a transactional task has been completed.

If, at step 210, the communication fallback engine determines that a predetermined number or threshold of the communications in the set of first fallback communications was unsuccessful, the transactional messaging system 24 proceeds to step 212. For example, in some embodiments, the communication fallback engine proceeds to step 212 only if all of the communications generated at step 208 are determined to be unsuccessful. As another example, in some embodiments, the communication fallback engine proceeds to step 212 if at least a certain number of communications are not identified as successful and/or certain activities have not yet been performed. It will be appreciated that any suitable criteria can be used for determining when to proceed to a fallback communication stage.

At step 212, the communication fallback engine transitions from one or more states 264a-264f at the first fallback level 254a to one or more states 268a-268e at an nth (e.g., second) fallback level 254b. When the communication fallback engine transitions from the first fallback level 254a to the nth fallback level 254b, the communication fallback engine can execute one or more states 268a-268e for one or more of the states 264a-264f in the first fallback level 254a. In the example illustrated in FIG. 6, two states 268a, 268b are executed at the nth fallback level 254b for a first state 264a at the first fallback level 254a, two states 268c, 268d are executed at the nth fallback level 254b for a third state 264c at the first fallback level 254a, and one state 268e is executed at the nth fallback level 254b for a fifth state 264e at the first fallback level 254a. No additional states are executed at the nth fallback level 254b for the second state 264b, the fourth state 264d, or the sixth state 264f of the first fallback level 254a. Each of the states 268a-268e at the nth fallback level 254b correspond to an nth (e.g., second) fallback communication channel identified for a corresponding initial state 260a-260c and/or a fallback communication channel identified for the corresponding prior fallback state 264a 264c, 264e.

The communication channels corresponding to each of the nth fallback level 254b states 268a-268e can correspond to different communication channels. For example, each of the states 268a-268e can utilize a different communication protocol, program, transmission path, transmission mechanism, etc. In some embodiments, one or more of the states 268a-268e can include the same or similar communication channel as that used by any of the other nth fallback level 254b states 268a-268e, any of the prior fallback level 254a states 264a-264f, and/or any of the initial states 260a-260c. For example, in some embodiments, a state 268a executed at the nth fallback level 254b can utilize the same communication channel as an initial state and/or a state executed at the first fallback level 254a. In some embodiments, communication channels can be reused when the likelihood of success for that communication channel is high and/or the cost of the communication channel is low.

The content of each of the communications generated at step 212 can be similar. For example, in various embodiments, a set of second fallback communications can all correspond to follow-up or tertiary notifications regarding the subject matter of the initial set of communications, e.g., a delivery, payment, scheduling, and/or other transactional interaction and/or secondary communications to the first set of fallback communications. In some embodiments, the content of each communication in the set of second fallback communications can be altered as compared to content of the communications in the initial set of communications and/or the content in the set of first fallback communications to indicate the fallback nature of the communications. For example, in some embodiments, the set of second fallback communications can include an indication that at least one communication in the initial set of communications and/or at least one communication in the set of first fallback communications was unsuccessful.

After step 212, the method returns to step 210, and the communication fallback engine determines whether any of the communications at the nth fallback level 254b were successful, e.g., determines whether any of the set of second fallback communications were successful. In some embodiments, step 212 and the iterative implementation of step 210 are implemented as one or more concurrent states in the fallback n-level state machine 250. For example, the nth fallback level 254b of the fallback n-level state machine 250 can be implemented as one or more concurrent states 266a-266c. The concurrent states 266a-266c can each include substates 268a-268e. In some embodiments, if any one of the substates states 268a-268e indicates a successful communication, the corresponding concurrent state 266a-266c completes and the fallback n-level state machine 250 proceeds to an end state (not shown).

If the method 200 proceeds through each nth fallback level in the fallback n-level state machine without successfully completing the required number of communications at any level, the method 200 exits without completing the communication campaign. For example, in some embodiments, the communication fallback engine exits only if all of the communications generated at each prior step are determined to be unsuccessful. The communication fallback engine can proceed through any number (e.g., n) of fallback levels including any number of fallback states. At each fallback level, any number of fallback communications can be generated based on the set of fallback communications generated at a prior step (e.g., n–1 level).

It will be appreciated that the use of composite and concurrent states allows for simultaneous execution of various states at various levels 252, 254a-254b within the fallback n-level state machine 250. For example, in various embodiments, the initial level 252 is implemented as a concurrent state including states 260a-260c as substates. If one or more of initial substates 260a-260c indicate a communication failure, i.e., due to a timeout, the corresponding first level fallback states can be executed as composite states within each of the corresponding initial substates 260a-260c.

For example, if the first initial state 260a times out (e.g., does not receive an indication of a successful communication before the timeout timer elapses), a first fallback state 264a and a second fallback state 264b can be executed as concurrent, composite states. The first fallback state 264a and the second fallback state 264b can be executed concurrently with the second initial state 260b and/or the third initial state 260c. If any one of the first fallback state 264a, the second fallback state 264b, the second initial state 260b, or the third initial state 260c generate a successful communication, the fallback n-level state machine can stop execution of other concurrent states and transition to a successful communication state.

It will be appreciated that any one fallback path 270a-270c can be operating at any of the potential levels 252, 254 while any other fallback path 270a-270c is operating at a different level 252, 254. By utilizing composite and concurrent states within the fallback n-level state machine, individual fallback paths, such as the fallback paths 270a-270c illustrated in FIG. 6, can be executed using different fallback timers while allowing any one fallback path 270a-270c to stop execution of the fallback n-level state machine upon a successful communication.

If all fallback paths 270a-270c are unsuccessful, at step 216, the communication fallback engine can log the unsuccessful communication attempts and can perform any additional operations, such as, for example, cancelling a transaction associated with the transactional communications, postponing a transaction, performing the transaction using default values, and/or any other suitable operations.

In some embodiments, fallback communication options can be weighted and tiered based on various considerations, such as cost, likelihood of success, time, etc. For example, in some embodiments, the communication channels utilized at a first fallback level 254a can have a lower cost and/or a higher likelihood of success as compared to communication channels used at a subsequent fallback level 254b. By utilizing lower cost or higher success communication channels at earlier fallback stages, the communication fallback engine can reduce the costs associated with sending fallback communications and increase the likelihood of a successful communication earlier in the fallback communication process.

Figure 7:
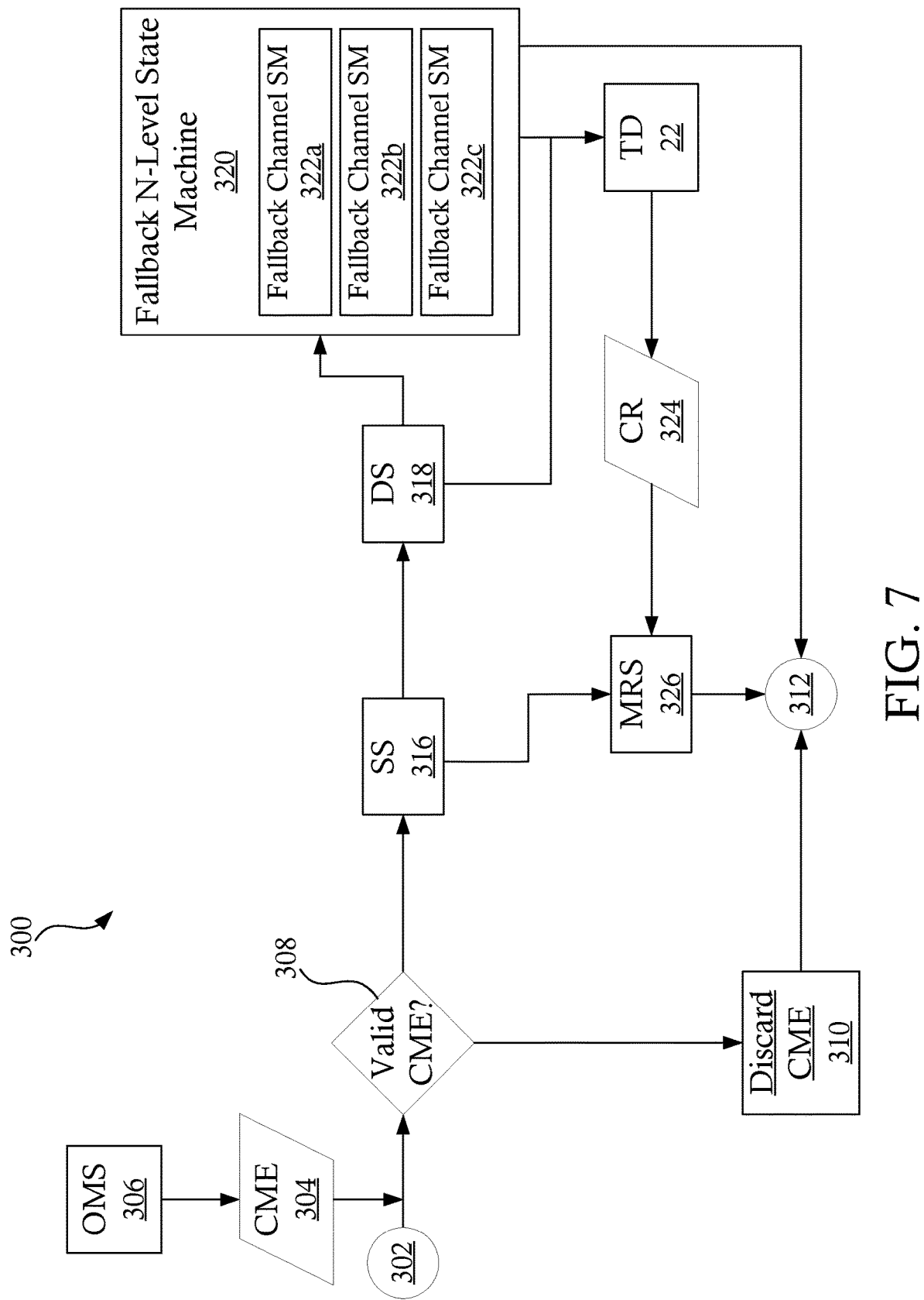
FIG. 7 illustrates an embodiment of an event-driven finite state machine configured for implementation by a transactional messaging system, in accordance with some embodiments.

FIG. 7 illustrates an embodiment of an event-driven finite state machine 300 configured for implementation by a communication fallback engine, in accordance with some embodiments. The finite state machine 300 can include any suitable state machine, such as, for example, a campaign-driven communication finite state machine. The finite state machine 300 includes a start state 302. The start state 302 is configured to receive a campaign message event (CME) 304 from an outside system, such as, for example, an order management system 306. The campaign message event 304 can include data detailing one or more communications to be generated via one or more communication channels.

After receiving the campaign message event 304, the finite state machine 300 performs a check 308 to determine the validity of the message event 304. If the check 308 fails, i.e., if the message event 304 cannot be validated, the message event 304 is discarded 310 and the finite state machine 300 enters an end state 312. If the check 308 succeeds, i.e., if the message event 304 is validated, the finite state machine 300 proceeds to a scheduling state (SS) 316 to schedule the initial set of communications associated with the campaign message event 304.

After scheduling the communications, the finite state machine 300 proceeds to communication dispatch state (DS) 318 to dispatch the initial set of communications identified at the scheduling state 316. The communications are transmitted to a target device (TD) 22. As discussed above, a fallback n-level state machine 320 can be implemented to manage fallback communications for each communication channel in the initial set of communications. The fallback n-level state machine 320 can implement any number of hierarchical fallback communication levels 322a-322c for each initial communication channel in the initial set of communications. The initial communication dispatch state 318 and the subsequent fallback states in the fallback n-level state machine 320 each include a timeout that causes the fallback n-level state machine 320 to transition to one or more fallback communication channels if the timeout period elapses without a confirmation reply (CR) 324 being received.

The finite state machine 300 monitors the fallback n-level state machine 320 to determine if and when a confirmation reply 324 is received from a target device 22. The confirmation reply 324 indicates that at least one of the communication channels in the fallback n-level state machine 320 was successfully executed, i.e., at least one communication was successful. If a confirmation reply 324 is received, the finite state machine 300 transitions to a message read state (MRS) 326. The finite state machine 300 can perform one or more functions at the message read state 326 before transitioning to an end state 312. If a confirmation reply 324 is not received, the fallback n-level state machine 320 can transition directly to an end state 312 after all of the fallback paths 322a-322c have completely timed out.

Figure 8:
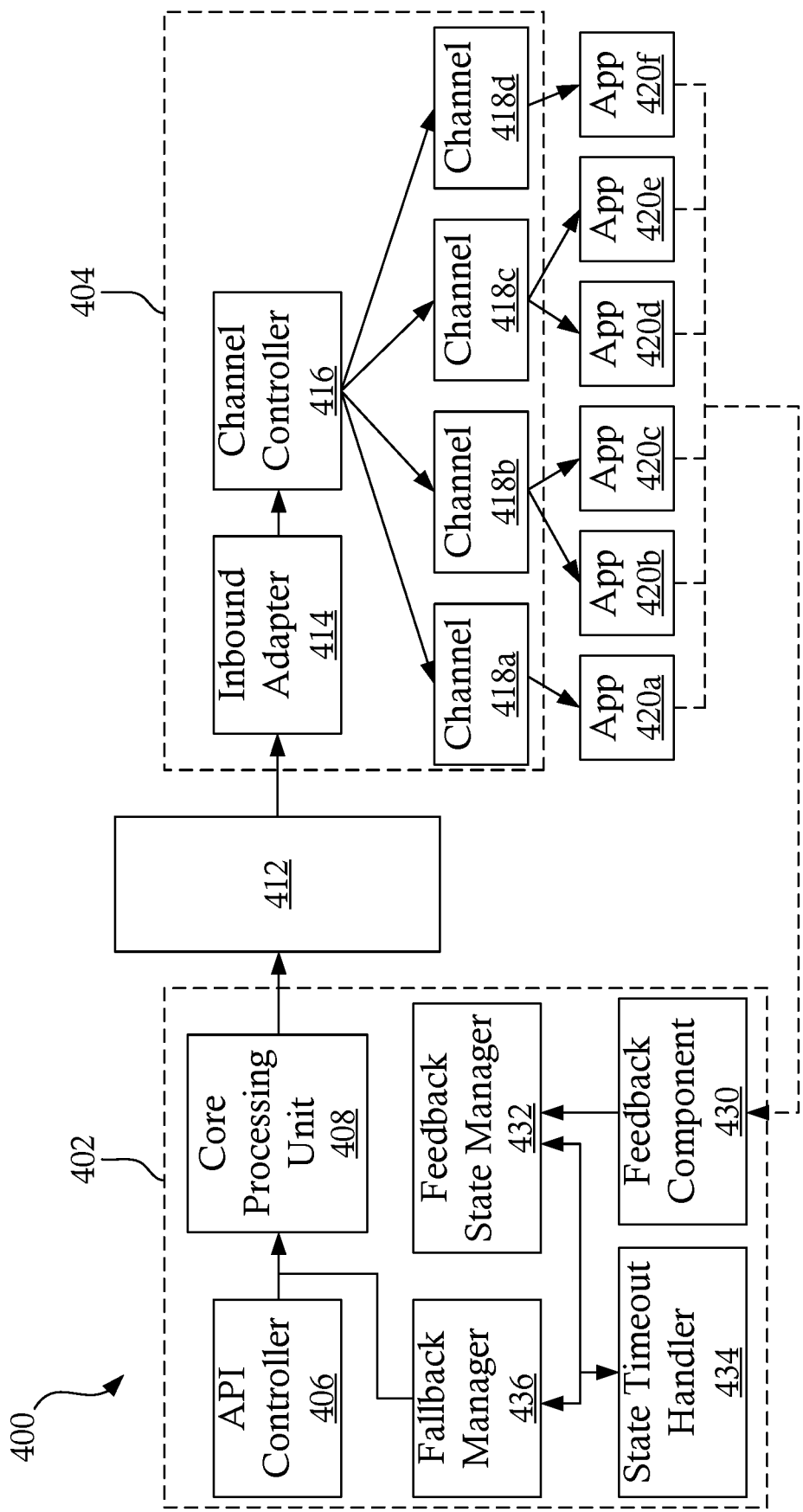
FIG. 8 illustrates a component architecture of a system configured to for message sending and feedback management, in accordance with some embodiments.

FIG. 8 illustrates a communication fallback engine component architecture 400 configured to for message sending and feedback management, in accordance with some embodiments. The component architecture 400 can be implemented by any suitable system, such as, for example, the transactional messaging system 24. Although the component architecture 400 illustrates various separated components for clarity, it will be appreciated that the illustrated components can be combined into one or more logical and/or physical components and/or can be logically or physically separated into additional components.

The component architecture 400 includes a core component 402 and a channel manager component 404. The core component 402 includes an application programming interface (API) controller 406 configured to provide input to a core processing unit 408. The core processing unit 408 is configured to implement various steps of a method of providing fallback communication, such as the method 200, and/or steps of an event-driven finite state machine, such as the event-driven finite state machine 300.

In some embodiments, the core processing unit 408 is in communication with an outbound adapter 410 configured to convert instructions from the core processing unit 408 to one or more platforms, such as a messaging platform 412. The messaging platform 412 can include any suitable messaging platform, such as, for example, a Kafka-based platform. The messaging platform 412 is configured to generate messages for each of a plurality of outbound communication channels.

The messaging platform 412 is in communication with an inbound adapter 414 of the channel manager component 404. The channel manager component 404 receives the generated messages from the messaging platform 412 via the inbound adapter 414 and provides each message to a channel controller 416. The channel controller 416 is configured to transmit each message over a selected communication channel 418a-418d. Each communication channel 418a-418d corresponds to at least one communication channel. For example, in various embodiments, a selected communication channel 418a-418d can include, but is not limited to, an SMS channel, an e-mail channel, an on-site messaging channel, a messaging app channel (e.g., WhatsApp, Signal, Slack, Discord, etc.), a push channel, an interactive voice response channel, and/or any other suitable communication channel.

In some embodiments, each of the communication channels 418a-418d transmits a message to a corresponding application or service 420a-420f. The corresponding applications or services can include internal and/or third-party applications and services. Each corresponding application or service 420a-420f can be configured to provide a message read event or notification when a message sent over the corresponding communication channel 418a-418d is delivered to a recipient. Delivery of a message can include, but is not limited to, the message being opened on a user device, the message being accessed via a user device, the message being listened to via a user device, etc.

When a message is opened or delivered via a corresponding application or service 420a-420f, a response message indicating that the message was delivered/opened/read is provided from the application or service 420a-420f to a feedback component 430 of the core component 402. The feedback component receives the response message and provides the response message to a feedback state manager 432 that monitors the current feedback state of the communications. For example, the feedback state manager 432 can maintain a log of which communications were delivered, opened, and/or read. In some embodiments, the feedback state manager 432 implements one or more states configured to represent a current feedback state of each communication for each application or service 420a-420f. In some embodiments, the feedback state manager 432 is configured to implement a concurrent and/or composite state machine, such as the fallback n-level state machine 250, the finite state machine 300, and/or any other suitable state machine. In some embodiments, a response message triggers one or more state transitions in a state machine implemented by the feedback state manager 432 and/or any other component.

The feedback state manager 432 is in communication with a state timeout handler 434. The state timeout handler 434 is configured to maintain one or more timeout timers for each state of a corresponding fallback n-level state machine, such as the fallback n-level state machine 250 discussed above. When a communication channel times-out, e.g., when a read receipt or other communication is not received from the corresponding application or service 420a-420f within a predetermined time period, a timeout notification is provided from the state timeout handler 434 to the feedback state manager 432, which indicates a timeout of a state corresponding to that application or service 420a-420f.

In some embodiments, the feedback state manager 432 and/or the state timeout handler 434 are in signal communication with a fallback manager 436 configured to implement and manage a fallback process, such as the fallback communication process discussed above with respect to FIGS. 5-7. The fallback manager 436 can be configured to implement one or more composite and/or concurrent state machines, such as the fallback n-level state machine 250, the finite state machine 300, and/or any other suitable state machine.

The fallback manager 436 can monitor prior communications to determine success and/or failure, can generate new fallback communications for fallback communication channels as discussed above, and/or perform other operations necessary to implement and maintain the method of fallback communication 200 discussed above. For example, in some embodiments, the fallback manager 436 is configured to implement nth level communications based on a predefined fallback communication scheme, as discussed above.

Figure 9:
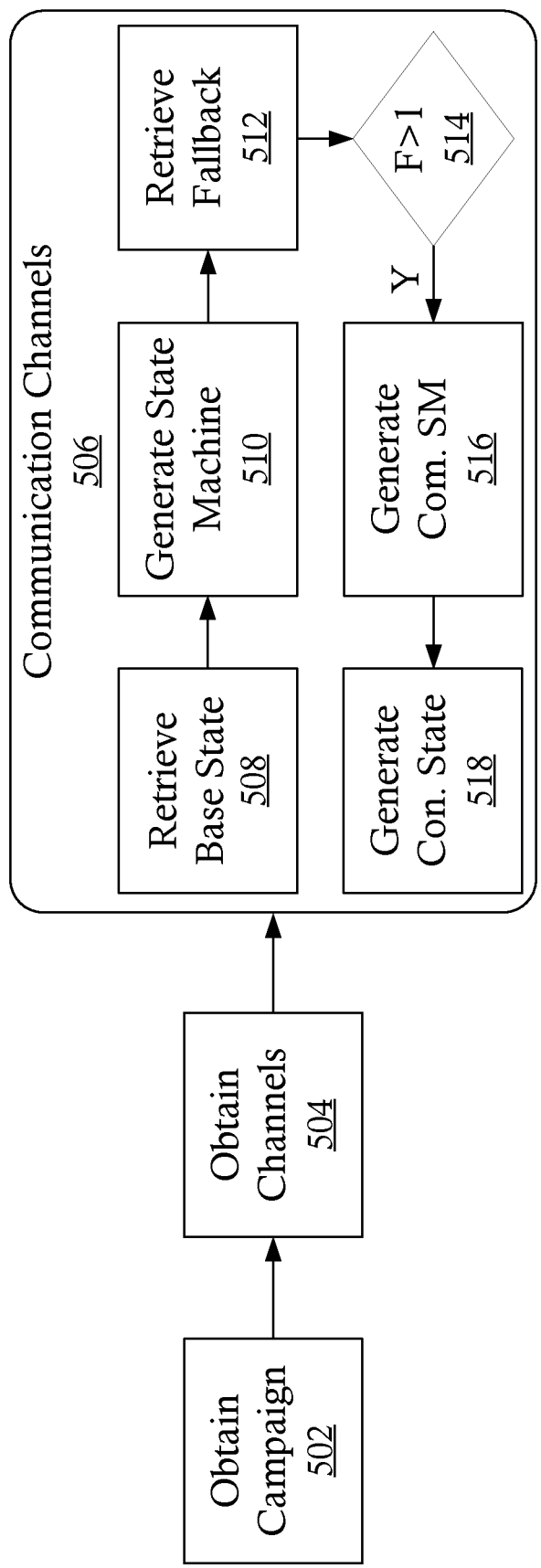
FIG. 9 illustrates a process flow for implementing a state machine, such as a fallback n-level state machine, in accordance with some embodiments.

FIG. 9 illustrates a process flow 500 for implementing a state machine, such as a fallback n-level state machine, in accordance with some embodiments. The process flow 500 can be implemented by, for example, a communication fallback engine. At an initial step, a communication campaign including one or more initial, or primary, communication channels is obtained 502, e.g., loaded into memory of a transactional messaging system 24. The communication campaign can define communication channels, frequency, content, and/or any other suitable parameters.

A set of channels associated with and/or identified by the communication campaign is obtained 504. The set of channels can be included in the communication campaign data and/or can be obtained separately. For example, in some embodiments, the communication campaign can identify a communication schema. The communication schema can be stored in and obtained from a database and can include data identifying the corresponding communication channels for the communication campaign.

In some embodiments, for each communication channel 506 identified in the communication campaign, a base state is retrieved or generated 508 for the corresponding communication channel. The base state can include information relevant to the selected communication channel, such as, for example, types and formats of response messages, timeout periods, and/or any other suitable state parameters. A state machine including a state representative of the base state for the selected communication channel is generated 510. If the communication for the selected communication channel 506 is unsuccessful, the system retrieves 512 the fallback communication channels (e.g., as identified in the fallback communication schema) for the selected channel and determines 514 if the number of fallbacks for the selected communication channel 506 is greater than one.

For each fallback communication channel, a composite state machine (CSM) is generated 516. The composite state machine for each fallback communication channel includes one or more states configured to determine whether the fallback communication is successful. For each fallback communication level, a concurrent state machine including each of the composite state machines for that fallback level is generated 518. For example, if a first communication channel includes two fallback communication channels, the composite state machine implemented for the first communication channel will include two concurrent state machines, one for each of the fallback communication channels. Similarly, if a second communication channel includes four fallback communication channels, the composite state machine implemented for the second communication channel will include four concurrent state machines.

Figure 10A:
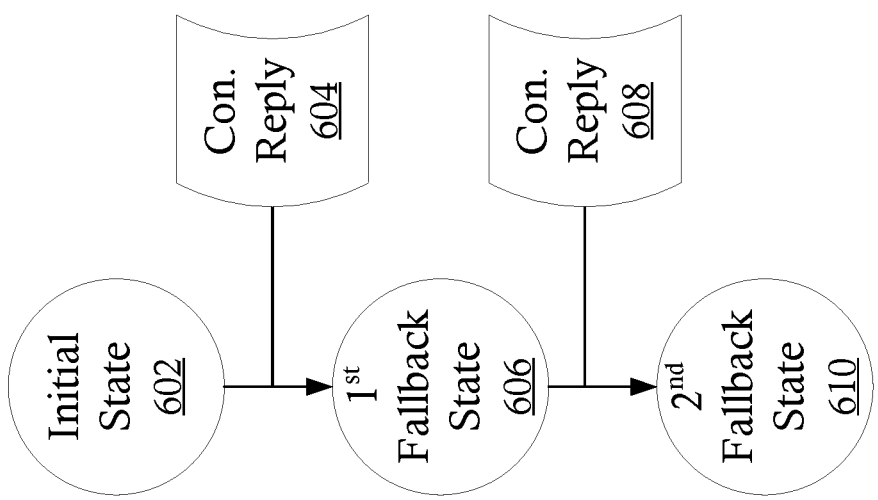
FIG. 10A illustrates a partial fallback n-level state machine embodying a fallback sequence for a first communication channel, in accordance with some embodiments.

FIG. 10A illustrates a partial fallback n-level state machine 600 embodying a fallback sequence for a first communication channel, in accordance with some embodiments. The partial fallback n-level state machine 600 includes an initial state 602 corresponding to an initial, or parent, communication channel. The initial communication channel can include any suitable communication channel, such as, for example, an email communication channel. If an expected confirmation reply 604, such as an email open event, is not received within a predetermined timeout period, the partial fallback n-level state machine 600 implements a first fallback level including a first fallback state 606 corresponding to a first fallback communication channel. The first fallback communication channel can include any suitable communication channel, such as, for example, an application push notification. If an expected confirmation reply 608, such as an application read notification, is not received within a predetermined timeout period, the partial fallback n-level state machine 600 implements a second fallback level including a second fallback state 610 corresponding to a second fallback communication channel.

Figure 10B:
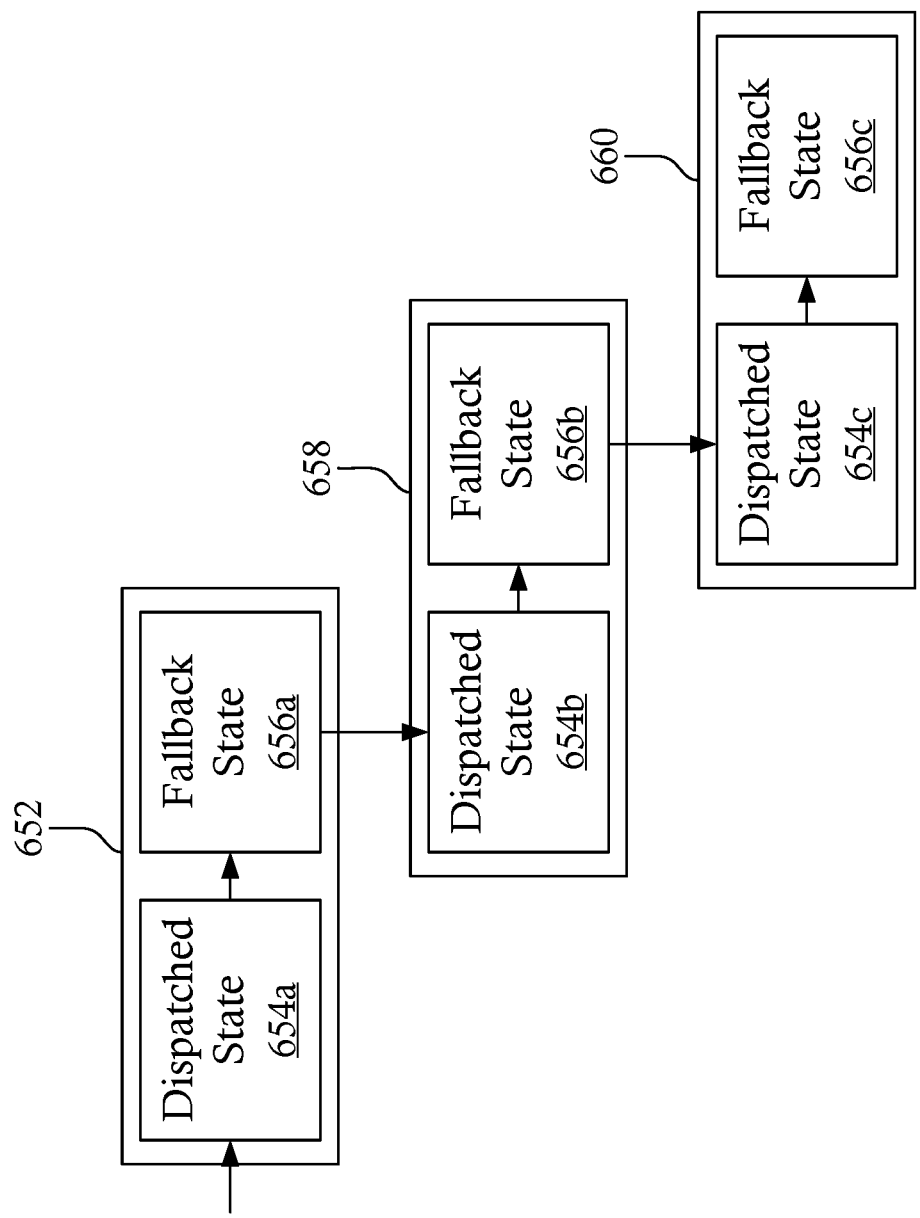
FIG. 10B illustrates a partial fallback n-level state machine having a nested state machine structure, in accordance with some embodiments.

As shown in FIG. 10B, the initial state 602, the first fallback state 606, and the second fallback state 610 can be implemented as a nested, or composite, composite state machine 650 in some embodiments. The initial state 602 is implemented as an initial state machine 652 including a dispatched state 654a and a fallback state 656a. Upon entry into the initial state machine 652, a communication is dispatched using the initial communication channel and a timeout timer is started. If the timeout timer elapses (e.g., on timeout), the initial state machine 652 transitions to the fallback state 656a, which causes a first fallback composite state 658 to be implemented.

The first fallback composite state 658 is implemented as a composite substate of the initial state machine 652. Although embodiments are illustrated herein including composite substates, it will be appreciated that the fallback states can considered sub-state machines within the initial state machine 652. The first fallback composite state 658 includes a dispatch state 654b and an invoke fallback state 656b. Upon entry into the first fallback composite state 658, a communication is dispatched using the first fallback communication channel and a timeout timer is started. If the timeout timer elapses, the first fallback composite state 658 transitions to the invoke fallback state 656b, which causes a second fallback composite state 660 to be implemented.

The second fallback composite state 660 is implemented as a composite substate of the first fallback composite state 658. The second fallback composite state 660 includes a dispatch state 654c and an invoke fallback state 656c. Upon entry into the second fallback composite state 660, a communication is dispatched using the second fallback communication channel and a timeout timer is started. As illustrated in FIG. 10B, if the second fallback composite state 660 receives a read event 662, the read event 662 is provided to each of the prior states 652, 658 as a read event, indicating successful completion of at least one communication within the composite state machine 650.

Figure 11:
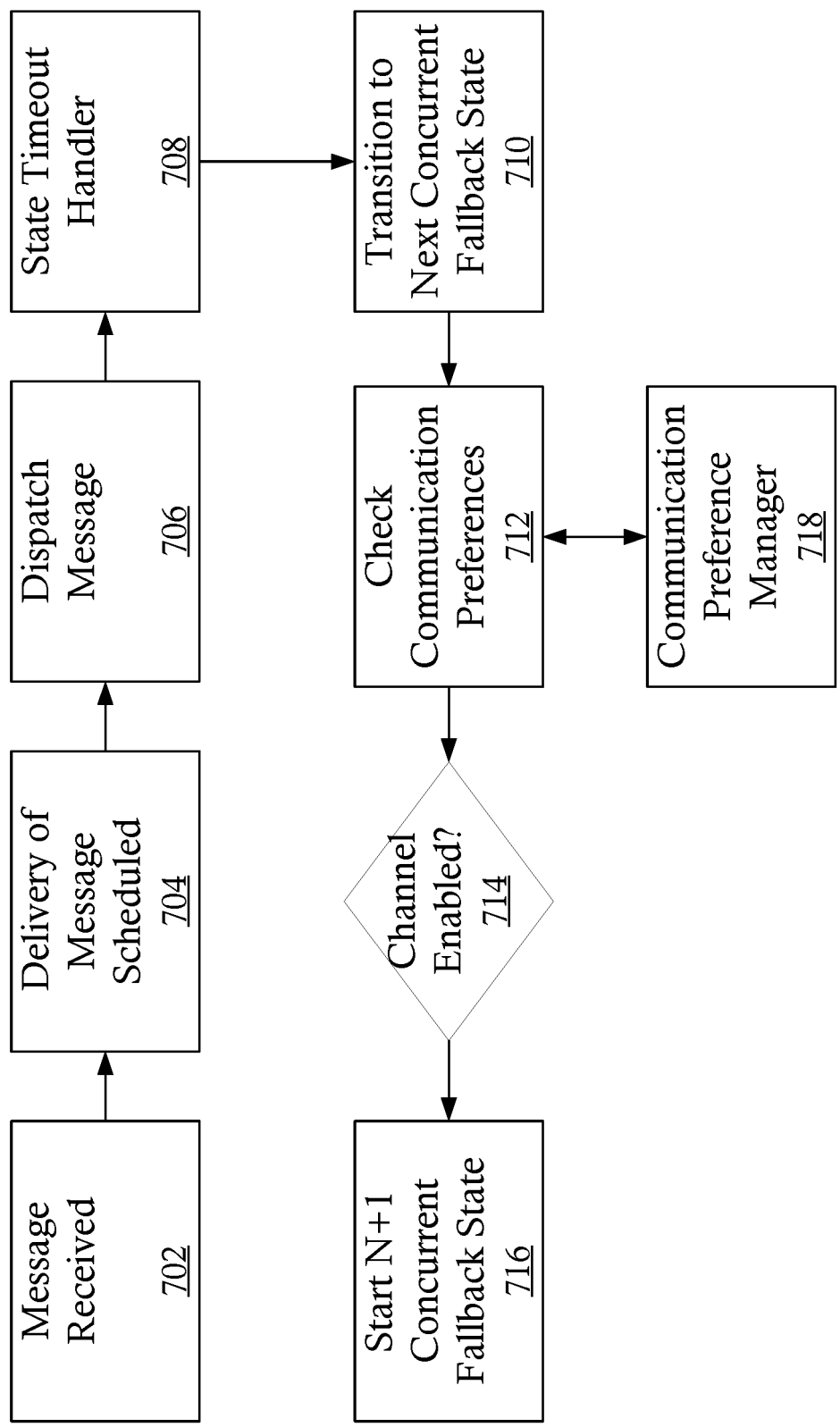
FIG. 11 illustrates a fallback execution activity diagram, in accordance with some embodiments.

FIG. 11 illustrates a fallback execution activity diagram 700, in accordance with some embodiments. The fallback execution activity diagram 700 illustrates fallback activity of a fallback n-level state machine implemented by, for example, a communication fallback engine, as discussed herein. At an initial step, the communication fallback engine receives 702 a communication, such as a message to be delivered via one or more communication channels, as indicated by a communication campaign. The communication fallback engine schedules 704 the message for delivery. Each message is dispatched 706 and a timeout timer is started 708 by a state timeout handler. The state timeout handler can be implemented by the transactional messaging system 24 and/or any other suitable systems.

If the timeout timer expires prior to a read receipt being received, a boundary transition occurs, and a fallback n-level state machine implemented by the communication fallback engine transitions 710 to a next level concurrent fallback state. In some embodiments, the communication fallback engine is configured to check communication preferences 712 for the communication recipient, e.g., an identified user device for the communication, prior to performing a fallback communication. In some embodiments, communication preferences are provided by a preference manager 718. If the communication fallback engine determines 714 that the communication channel of the current fallback communication is enabled, the fallback n-level state machine enters the next concurrent fallback state 716 and generates a fallback communication.

Figure 12:
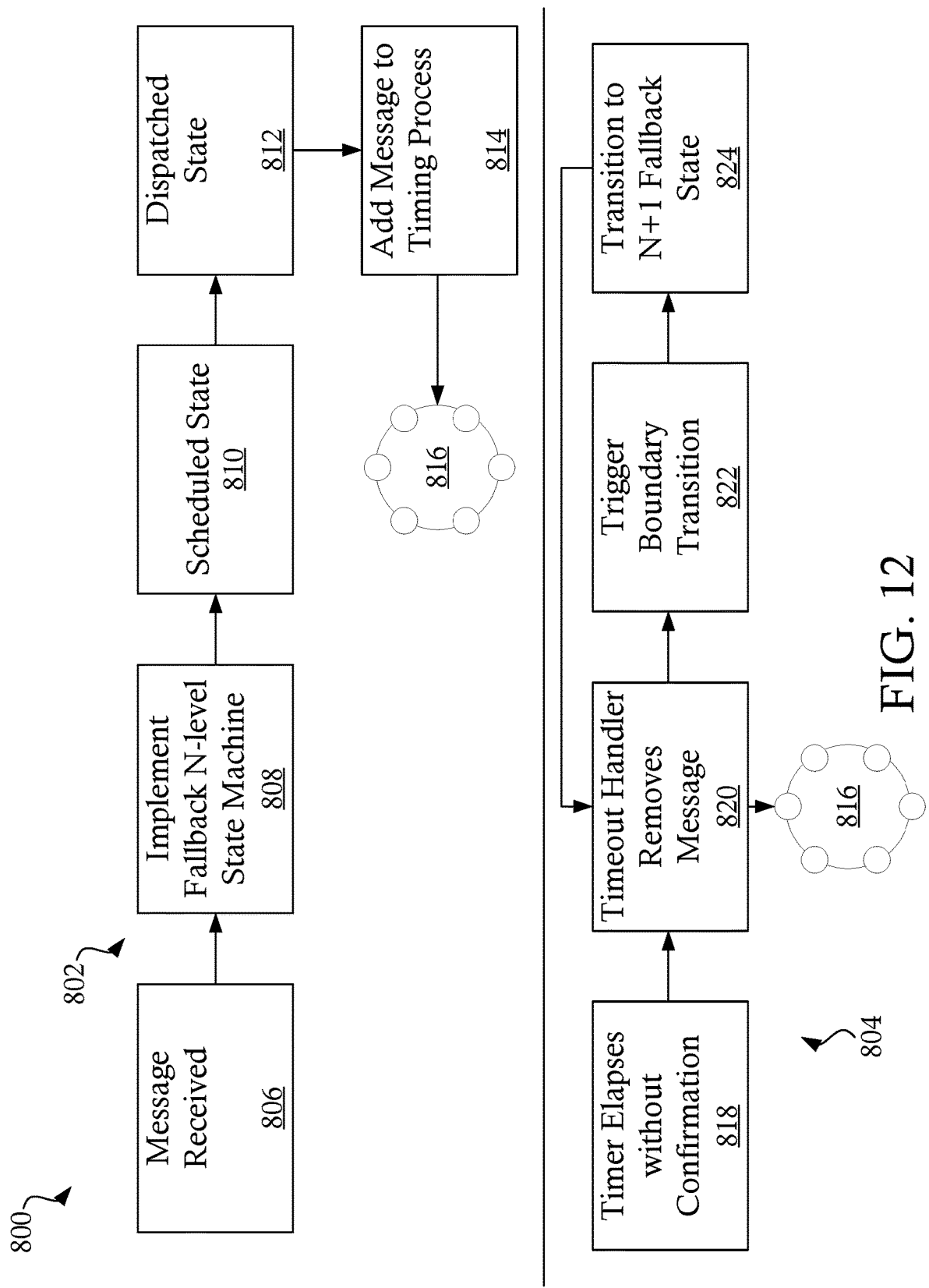
FIG. 12 illustrates a process flow illustrating a dispatched state timeout handling process, in accordance with some embodiments.

FIG. 12 illustrates a process flow 800 illustrating a dispatched state timeout handling process, in accordance with some embodiments. The process flow 800 includes a new message addition subprocess 802 and a timeout action execution subprocess 804. When a message is received 806 by a transactional messaging system, such as the transactional messaging system 24, a fallback n-level state machine (or a substate of an existing fallback n-level state machine) can be implemented 808 in a scheduled state 810 indicating a message is scheduled for delivery. When the message is dispatched, a boundary transition occurs to a dispatched state 812 and a timeout handler adds 814 the message to a timing process, such as a timing wheel 816, for the corresponding communication.

When a timeout elapses 818, the timeout handler removes 820 the corresponding message from the timing process, such as the timing wheel 816, and generates a timeout action. The timeout action triggers 822 a boundary transition to the next fallback state 824 in the fallback n-level state machine. As illustrated in FIG. 12, the timeout handler is invoked for each state and each state machine in the fallback n-level state machine.

Figure 13:
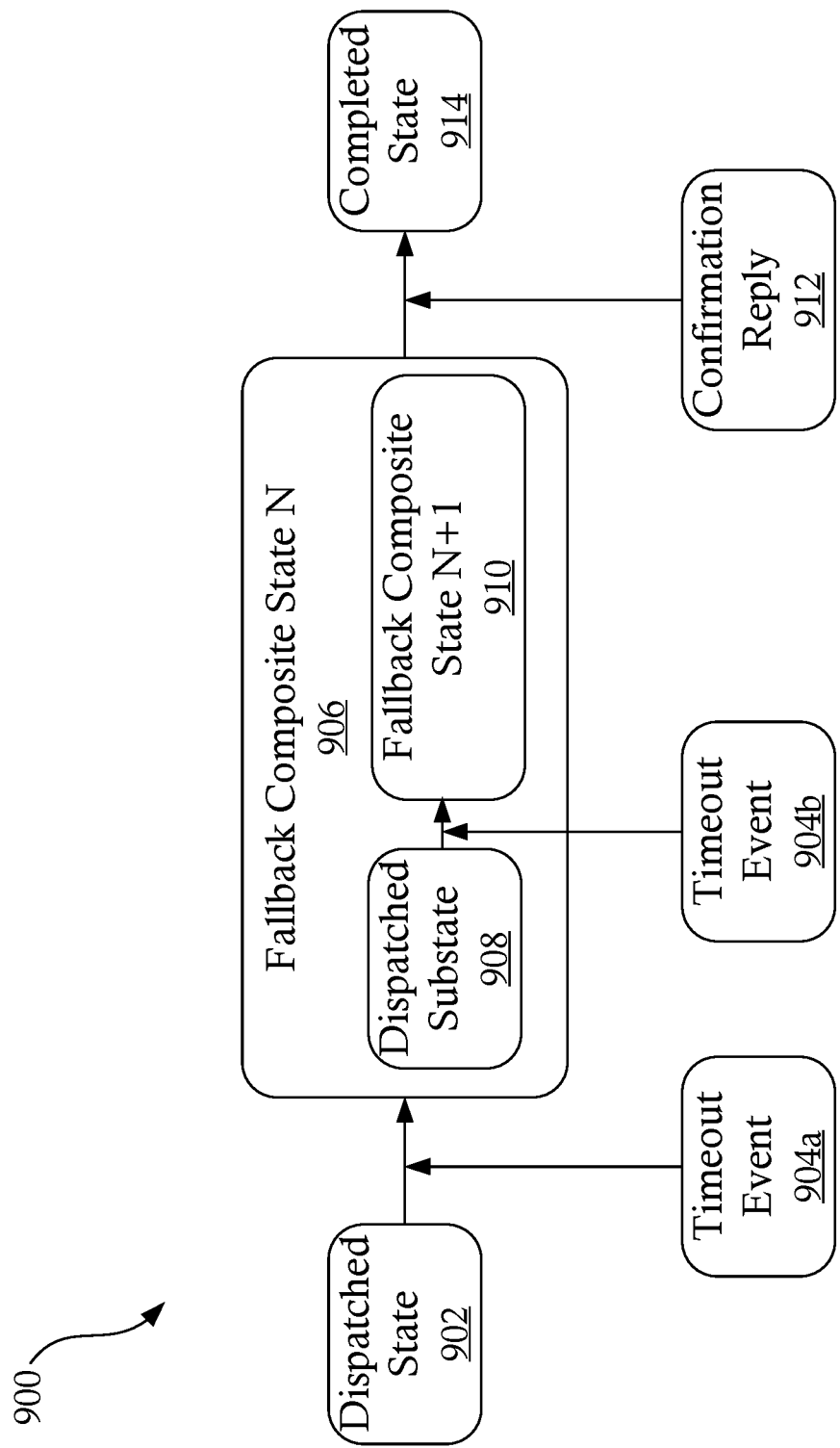
FIG. 13 illustrates a fallback n-level state machine having nested composite state cascading completion to a parent state, in accordance with some embodiments.

FIG. 13 illustrates a fallback n-level state machine 900 having nested composite state cascading completion to a parent state, in accordance with some embodiments. The fallback n-level state machine 900 includes an initial dispatched state 902 corresponding to an initial communication over an initial communication channel. If a timeout event 904a occurs, e.g., if the initial dispatched state 902 times out without receiving a confirmation reply, the fallback n-level state machine 900 implements a boundary transition to a fallback composite state N 906.

The fallback composite state N 906 includes a dispatched state 908 corresponding to dispatch of a first fallback communication over a first fallback communication channel. If a second timeout event 904b occurs, e.g., if the fallback dispatched state 908 times out without receiving a confirmation reply, the fallback composite state N 906 implements a boundary transition to a fallback composite state N+1 910. The fallback composite state N+1 910 is similar to the fallback composite state N 906 and is implemented as a concurrent state within fallback composite state N 906.

The fallback n-level state machine 900 can implement any number of fallback composite states, with each subsequent state being implemented as a fallback composite state within the prior (e.g., N−1) state. If any of the fallback composite states, such as the N+1 fallback composite state 910, receives a confirmation event 912, the set of nested composite states each receive a confirmation event and transition to a state representing a completed communication 914.

Figure 14:
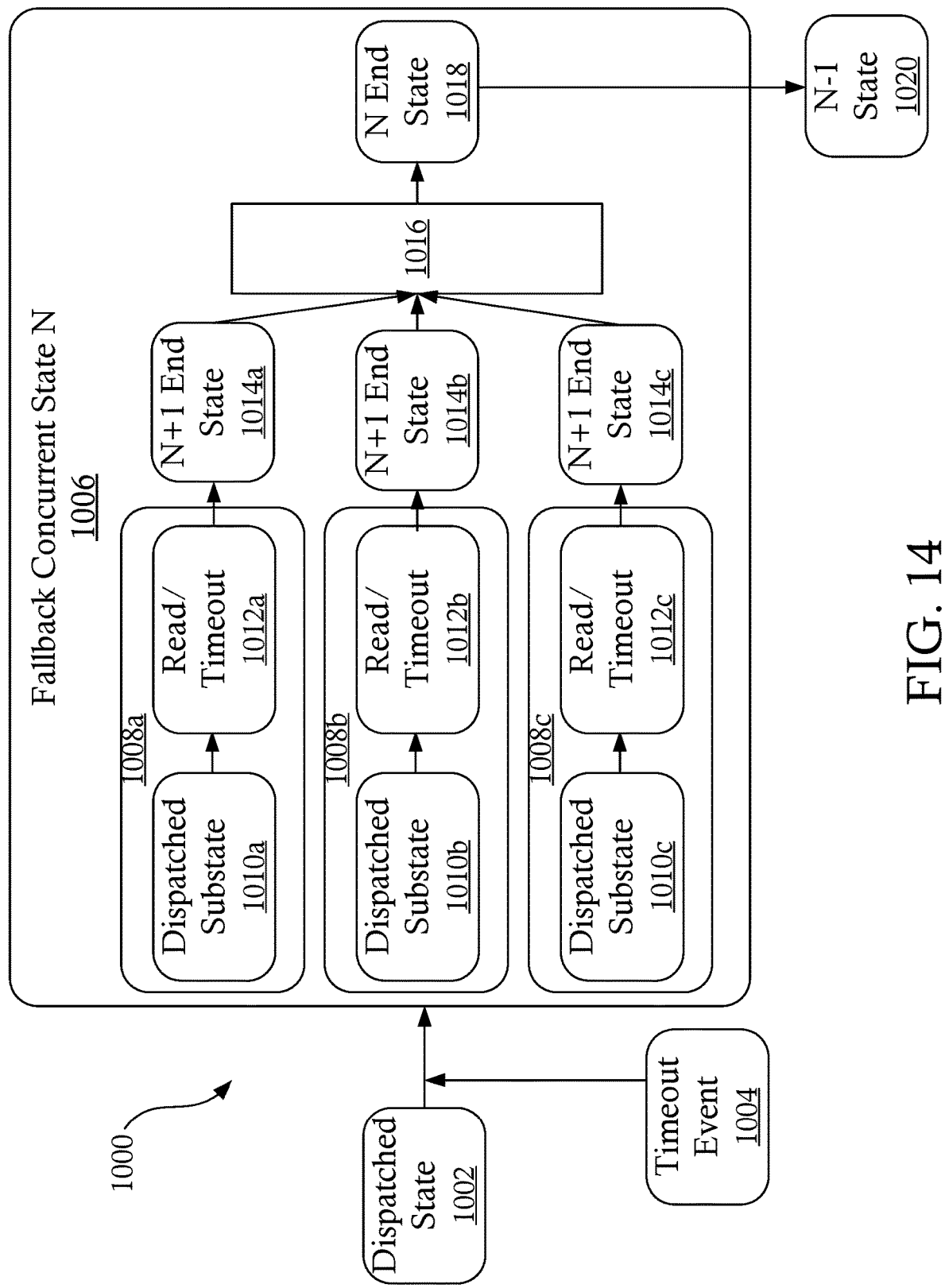
FIG. 14 illustrates a one-level fallback state machine a fallback concurrent state including a synchronization barrier, in accordance with some embodiments.

FIG. 14 illustrates a one-level fallback state machine 1000 having a fallback concurrent state including a synchronization barrier, in accordance with some embodiments. The one-level fallback state machine 1000 includes an initial dispatched state 1002 corresponding to an initial communication dispatched over an initial communication channel. If a confirmation event is not received within the predetermined timeout period, e.g., if a timeout event 1004 occurs, the one-level fallback state machine 1000 transitions to a fallback composite state 1006. The fallback composite state 1006 includes a plurality of concurrently executed fallback substates 1008a-1008c, each corresponding to a fallback communication generated over a fallback communication channel. The fallback composite state 1006 is similar to the concurrent composite states previously discussed.

Each of the concurrent fallback substates 1008a-1008c includes a dispatched substate 1010a-1010c, corresponding to dispatch of a message via a corresponding communication channel, and a confirmation receipt or timeout state 1012a-1012c, corresponding to completion of the concurrent fallback substate 1008a-1008c. At completion, each concurrent fallback substate 1008a-1008c generates a completion event 1014a-1014c. Each of the completion events 1014a-1014c is provided to a synchronization barrier 1016. The synchronization barrier 1016 is configured to delay completion of the fallback composite state 1006 until each of the concurrent substates 1008a-1008c has finished executing. Upon receiving all of the completion events 1014a-1014c, the synchronization barrier 1016 generates a N-level completion event 1018 corresponding to completion of the fallback composite state 1006. The N-level completion event 1018 indicates a successful communication if any of the N+1 level completion events 1014a-1014c indicated a successful communication. The N-level completion event 1018 cascades the underlying completion events 1014a-1014c to higher levels (e.g., the prior state 1020) of the one-level fallback state machine 1000.

As disclosed herein, in various embodiments, a communication fallback engine can be configured to implement a concurrent, composite state machine configured to provide hierarchical fallback communications over a plurality of communication channels. The disclosed hierarchical, concurrent, composite state machines provide nested state machines that can be extended to any number of fallback levels to provide complex fallback graphs for various initial communication schema. Example communications that can be generated by the communication fallback engine using the disclosed systems and methods include, but are not limited to, payment authorizations, order placement notifications, order completion notifications, order picking completed notifications, order delayed notifications, out for delivery notifications, and/or any other suitable transactional notification.

Each of the disclosed communications can be performed using any suitable communication protocols, software, channels, encoding, etc. Various non-limiting examples of communication types include short message service (SMS) messages, multimedia messaging service (MMS) messages, e-mail, push notifications, chat messaging systems (e.g., WhatsApp, Signal, Messenger, etc.), automated voice calls, automated voice messages, etc. It will be appreciated that any communication mechanism and/or channel that can be controlled by the transactional messaging system can be used to provide transactional communication.

Each functional component described herein can be implemented in computer hardware, in program code, and/or in one or more computing systems executing such program code as is known in the art. As discussed above with respect to FIG. 1, such a computing system can include one or more processing units which execute processor-executable program code stored in a memory system. Similarly, each of the disclosed methods and other processes described herein can be executed using any suitable combination of hardware and software. Software program code embodying these processes can be stored by any non-transitory tangible medium, as discussed above with respect to FIG. 1.

Although the subject matter has been described in terms of exemplary embodiments, it is not limited thereto. Rather, the appended claims should be construed broadly, to include other variants and embodiments, which can be made by those skilled in the art.

What is claimed is:

1. A system configured to provide fallback communications, comprising:
   a memory having instructions stored thereon;
   a transceiver; and
   a processor operatively coupled to the memory and the transceiver, wherein the processor is configured to execute the instructions to:
   receive, via the transceiver, a communication campaign including data identifying at least one communication channel;
   implement a fallback state machine having a first composite state corresponding to the at least one communication channel, wherein the first composite state is stored in the memory;
   transmit, via the transceiver, an initial electronic communication via the at least one communication channel;
   implement an initial timer having a first predetermined timeout period;
   when a confirmation is received prior to expiration of the initial timer:
   transition the fallback state machine to a complete state, wherein
   the complete state is stored in the memory;
   when the confirmation is not received prior to expiration of the initial timer:
   implement a first composite fallback state corresponding to a first set of fallback communication channels, wherein the first composite fallback state is stored in the memory; and
   transmit, via the transceiver, a first fallback electronic communication via the first set of fallback communication channels.

2. The system of claim 1, wherein the first set of fallback communication channels includes a first fallback communication channel and a second fallback communication channel, and wherein the first composite fallback state includes a set of concurrent states having a first composite substate corresponding to the first fallback communication channel and a second composite substate state corresponding to the second fallback communication channel.

3. The system of claim 1, wherein the processor is further configured to:
   implement at least one fallback timer having a second predetermined timeout period;
   when a fallback channel confirmation is received prior to expiration of the at least one fallback timer:
   generate the confirmation; and
   transition the fallback state machine to the complete state; and
   when the fallback channel confirmation is not received prior to expiration of the at least one fallback timer:
   implement a second composite fallback state corresponding to a second set of fallback communication channels, wherein the second composite fallback state includes a substate of the first composite fallback state, and wherein the second composite fallback state is stored in the memory; and
   transmit, via the transceiver, a second fallback electronic communication via the second set of fallback communication channels.

4. The system of claim 3, wherein the first set of fallback communication channels includes a first fallback communication channel and a second fallback communication channel, and wherein the at least one fallback timer includes a first fallback timer for the first fallback communication channel and a second fallback timer for the second fallback communication channel.

5. The system of claim 1, wherein the first composite fallback state comprises a synchronization barrier configured to delay completion of the first composite fallback state until each concurrent substate in the first composite fallback state has completed.

6. The system of claim 1, wherein the timer is implemented by a timing wheel.

7. The system of claim 1, wherein the at least one communication channel includes at least a first initial communication channel and a second initial communication channel, wherein the first composite state is a concurrent composite state including a first concurrent composite state corresponding to the first initial communication channel and a second concurrent composite state corresponding to the second initial communication channel.

8. A non-transitory computer-readable medium having instructions stored thereon, wherein the instructions, when executed by at least one processor, cause a device to perform operations comprising:
   implementing a fallback state machine having a plurality of composite states including a first composite state representative of a first communication channel and a second composite state representative of a second communication channel;
   transmitting a set of initial electronic communications via the first communication channel and the second communication channel;
   transitioning the first composite state of the fallback state machine to a dispatched substate when a first initial electronic communication in the set of initial electronic communications is transmitted via the first communication channel;

transitioning the second composite state of the fallback state machine to a dispatched substate state when a second initial electronic communication in the set of initial electronic communications is transmitted via the second communication channel;

implementing an initial timer having a predetermined timeout period for each of the first composite state and the second composite state;

when a confirmation is received prior to expiration of the initial timer, transitioning the fallback state machine to a complete state;

when the confirmation is not received prior to expiration of the initial timer:
   implementing a first composite fallback state corresponding to a set of first fallback communication channels; and
   transmitting a first fallback electronic communication via at least one communication channel in the set of first fallback communication channels.

9. The non-transitory computer-readable medium of claim 8, wherein the instructions cause the device to perform operations comprising:

implementing at least one fallback timer having a second predetermined timeout period;

when a fallback channel confirmation is received prior to expiration of the at least one fallback timer:
   generating the confirmation; and
   transitioning the fallback state machine to the complete state; and when the fallback channel confirmation is not received prior to expiration of the at least one fallback timer:
   implementing a second composite fallback state corresponding to a set of second fallback communication channels, wherein the second composite fallback state is a substate of the first composite fallback state; and
   transitioning the second composite fallback state to a first fallback substate when a second fallback electronic communication is transmitted via a second fallback communication channel in the set of second fallback communication channels.

10. The non-transitory computer-readable medium of claim 8, wherein the first composite fallback state includes a set of concurrent states each having a composite substate, and wherein each concurrent state in the set of concurrent states corresponds to a first fallback communication channel in the set of first fallback communication channels.

11. The non-transitory computer-readable medium of claim 8, wherein the set of initial communication channels includes at least a first initial communication channel and a second initial communication channel, wherein the first composite state is a concurrent composite state including a first concurrent composite state corresponding to the first initial communication channel and a second concurrent composite state corresponding to the second initial communication channel.

\* \* \* \* \*